United States Patent
Patel

(10) Patent No.: US 12,475,236 B2
(45) Date of Patent: Nov. 18, 2025

(54) WRITE PROTECT FUNCTION WITH SECURE CERTIFICATE AUTHENTICATION

(71) Applicant: Renesas Electronics America Inc., Milpitas, CA (US)

(72) Inventor: Shwetal Arvind Patel, San Jose, CA (US)

(73) Assignee: Renesas Electronics America Inc., Milpitas, CA (US)

( * ) Notice: Subject to any disclaimer, the term of this patent is extended or adjusted under 35 U.S.C. 154(b) by 278 days.

(21) Appl. No.: 18/066,433

(22) Filed: Dec. 15, 2022

(65) Prior Publication Data

US 2023/0394160 A1 Dec. 7, 2023

Related U.S. Application Data

(60) Provisional application No. 63/348,783, filed on Jun. 3, 2022.

(51) Int. Cl.
*G06F 21/62* (2013.01)
*G06F 21/33* (2013.01)
*G06F 21/60* (2013.01)
*G06F 21/64* (2013.01)

(52) U.S. Cl.
CPC .......... *G06F 21/602* (2013.01); *G06F 21/33* (2013.01); *G06F 21/64* (2013.01)

(58) Field of Classification Search
CPC ........ G06F 21/602; G06F 21/62; G06F 21/33; G06F 21/64
USPC ...................................................... 726/26, 34
See application file for complete search history.

(56) References Cited

U.S. PATENT DOCUMENTS

| | | | | |
|---|---|---|---|---|
| 6,249,872 B1* | 6/2001 | Wildgrube | .......... | G06F 12/1466 726/2 |
| 8,701,157 B1* | 4/2014 | Wilson | .................... | H04L 63/08 726/1 |
| 2003/0037246 A1* | 2/2003 | Goodman | ............. | G06F 21/572 713/191 |
| 2008/0010451 A1* | 1/2008 | Holtzman | ............. | H04L 9/3273 713/158 |
| 2008/0010455 A1* | 1/2008 | Holtzman | ............. | H04L 9/3263 713/168 |
| 2017/0024570 A1* | 1/2017 | Pappachan | ............. | G06F 13/28 |

(Continued)

OTHER PUBLICATIONS

NPL Search Terms (Year: 2025).*

*Primary Examiner* — Syed A Zaidi
(74) *Attorney, Agent, or Firm* — SCULLY, SCOTT, MURPHY & PRESSER, P.C.

(57) ABSTRACT

In an embodiment, an apparatus is disclosed that includes a memory slot including a certificate chain corresponding to an entity and a memory block. The memory block has protection enabled. The apparatus includes a processing device. The processing device is configured to receive a request message to clear protection for the memory block from a computing device of the entity. The request message includes a signature generated based at least in part on a private key of the entity. The processing device is configured to determine a public key corresponding to the entity based at least in part on the certificate chain, determine that the signature is valid based at least in part on the public key, determine that the protection for the memory block corresponds to the certificate chain and clear the protection for the memory block.

12 Claims, 14 Drawing Sheets

(56) References Cited

U.S. PATENT DOCUMENTS

2018/0097639 A1\* 4/2018 Gulati .................... G09C 1/00
2019/0044957 A1\* 2/2019 David .................. H04L 63/126
2019/0349347 A1\* 11/2019 Curtis ................ H04L 63/0876

\* cited by examiner

| Message Parameter | Offset | Field | Size (Bytes) |
|---|---|---|---|
| Header | 0 | Protocol Version | 1 |
| Header | 1 | Message Type | 1 |
| Header | 2 | Parameter 1 | 1 |
| Header | 3 | Parameter 2 | 1 |
| Payload | 4 | Block ID | 4 |
| Payload | 8 | Nonce | 32 |
| Payload | 40 | Signature | S |

| Message Parameter | Offset | Field | Size (Bytes) |
|---|---|---|---|
| Header | 0 | Protocol Version | 1 |
| | 1 | Message Type | 1 |
| | 2 | Parameter 1 | 1 |
| | 3 | Parameter 2 | 1 |
| Payload | 4 | Nonce | 32 |
| | 36 | Block Status | 4 |
| | 40 | Signature | 5 |

FIG. 11

WRITE PROTECT FUNCTION WITH SECURE CERTIFICATE AUTHENTICATION

CROSS-REFERENCE TO RELATED APPLICATION

This application claims the benefit of U.S. Provisional Application No. 63/348,783, filed Jun. 3, 2022, the entire contents of which are incorporated herein by reference.

BACKGROUND OF THE SPECIFICATION

The present disclosure relates to data protection. More specifically, the present disclosure relates in some embodiments to read and write protection of data using secure certificate authentication.

Regarding write protection, some non-volatile memory blocks in memory modules such as, e.g., a dual in-line memory module (DIMM) or dynamic random access memory (DRAM), are write protected until explicitly cleared. In some cases, for example, certain blocks of data are reserved for use by various entities involved in the production of the memory modules including, e.g., memory module manufacturers, chip manufacturers, the system environment manufacturer or other entities.

Once the write protection is set for particular blocks, the write protection often cannot be cleared without removing the memory module from service since modifying the write protection function or write protected block content often requires establishing particular connections that may be present in a test environment but are not typically available during normal usage. Managing write protection and the clearing or rewriting of write protected blocks in a normal operating system environment in a secure manner can be challenging.

SUMMARY

In an embodiment, an apparatus is disclosed that comprises a memory slot comprising a certificate chain corresponding to an entity and a memory block. The memory block has protection enabled. The apparatus further comprises at least one processing device coupled to memory. The at least one processing device is configured to receive a request message to clear protection for the memory block from a computing device of the entity. The request message comprises a signature generated based at least in part on a private key of the entity. The at least one processing device is configured to determine a public key corresponding to the entity based at least in part on the certificate chain, determine that the signature is valid based at least in part on the public key, determine that the protection for the memory block corresponds to the certificate chain and clear the protection for the memory block based at least in part on the determination that the signature is valid and that the protection for the memory block corresponds to the certificate chain.

In some embodiments, the at least one processing device is further configured to receive a request message to void the certificate chain from a computing device of the entity. The request message comprises a signature generated based at least in part on a private key of the entity. the at least one processing device is further configured to determine the public key corresponding to the entity based at least in part on the certificate chain, determine that the signature is valid based at least in part on the public key and void the certificate chain based at least in part on the determination that the signature is valid.

In another embodiment, an apparatus is disclosed that comprises a memory slot comprising a certificate chain corresponding to an entity and at least one processing device coupled to memory. The at least one processing device is configured to receive a request message to update firmware of the apparatus. The request message comprises a signature generated based at least in part on a private key of the entity. The at least one processing device is configured to determine a public key corresponding to the entity based at least in part on the certificate chain, determine that the signature is valid based at least in part on the public key and perform a firmware update operation based at least in part on the determination that the signature is valid.

In another embodiment, a method implemented by at least one processing device comprising hardware is disclosed. The method comprises receiving a request message to clear protection for a memory block of an apparatus from a computing device of an entity. The request message comprises a signature generated based at least in part on a private key of the entity. The method further comprises determining a public key corresponding to the entity based at least in part on a certificate chain installed in a memory slot of the apparatus. The certificate chain corresponds to the entity. The method further comprises determining that the signature is valid based at least in part on the public key, determining that the protection for the memory block corresponds to the certificate chain and clearing the protection for the memory block based at least in part on the determination that the signature is valid and that the protection for the memory block corresponds to the certificate chain.

In some embodiments, the method further comprises receiving a request message to void the certificate chain from a computing device of the entity. The request message comprises a signature generated based at least in part on a private key of the entity. The method further comprises determining the public key corresponding to the entity based at least in part on the certificate chain, determining that the signature is valid based at least in part on the public key and voiding the certificate chain based at least in part on the determination that the signature is valid.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 10 is a diagram of an example request message format according to an embodiment.

FIG. 11 is a diagram of an example response message format according to an embodiment.

DETAILED DESCRIPTION

Figure 1:
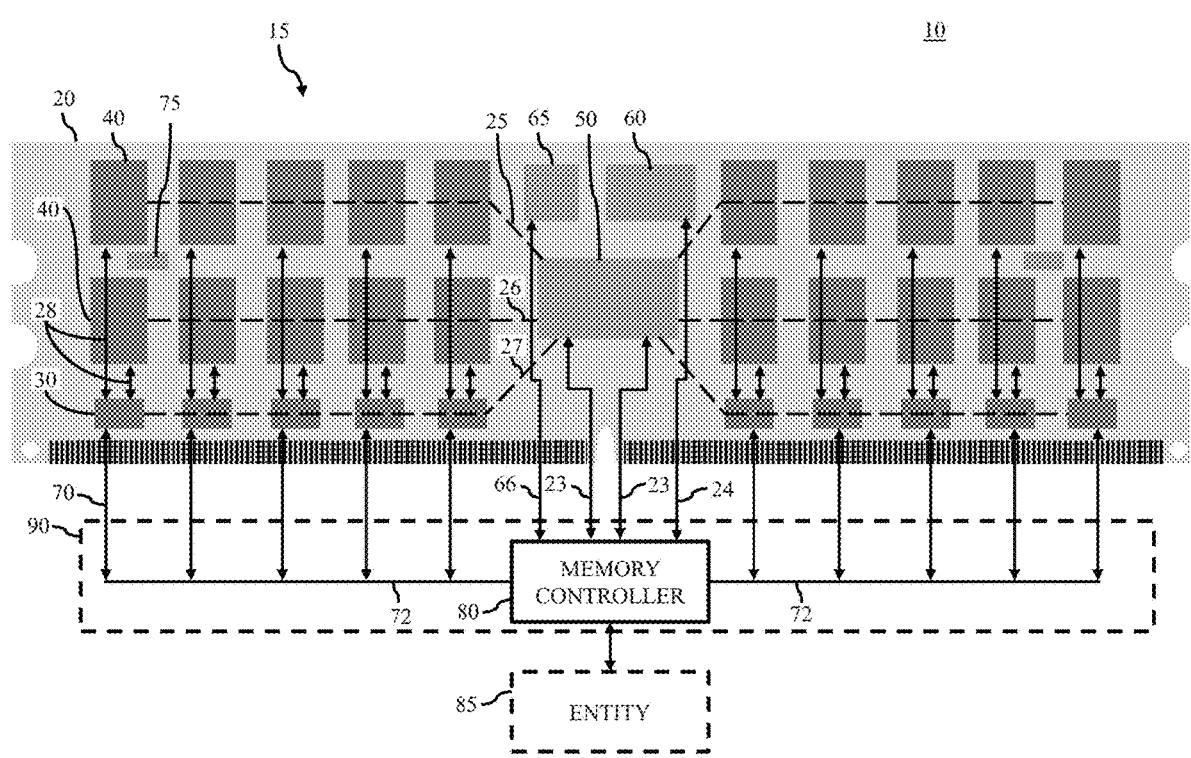
FIG. 1 is a diagram of an example memory system according to an embodiment.
Figure 2:
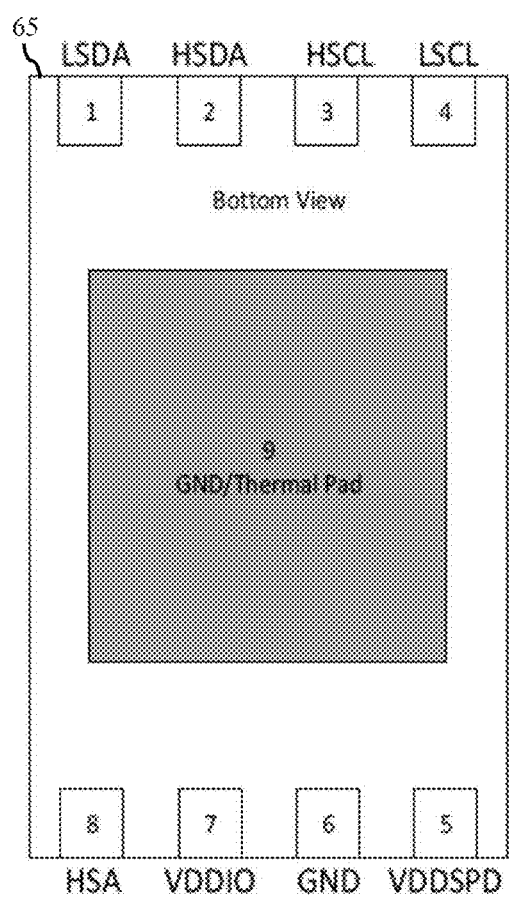
FIG. 2 is a diagram of an example serial presence detect (SPD) hub of the memory system of FIG. 1 according to an embodiment.

FIGS. 1 and 2 illustrate an example embodiment of an information processing system 10, such as a memory system 15 that includes a memory module 20, connectors 70, a memory controller 80 and an entity 85. While described and illustrated herein as having a particular type, arrangement and number of components, in other embodiments, the information processing system 10 may comprise any other type, arrangement or number of components.

With reference to FIG. 1, in one example embodiment, memory system 15 includes a memory module 20 that comprises a dual in-line memory module (DIMM), a dynamic random access memory (DRAM) module or any other memory module. In some embodiments, memory module 20 may be implemented as double data rate (DDR) RAM modules. In some embodiments, memory module 20 may be implemented as DDR fifth generation (DDR5) synchronous dynamic random-access memory (SDRAM) module or any other generation of DDR module. In one example, the disclosed embodiments may comprise unbuffered dual inline memory modules (UDIMM). For example, for a notebook computer, the disclosed embodiments may comprise small outline dual in-line memory modules (SODIMM) such as, e.g., DDR5 SODIMM. In another example, the disclosed embodiments may comprise registered dual inline memory modules (RDIMM). While memory module 20 is described and illustrated herein as having a particular type, arrangement and number of components, in other embodiments, memory module 20 may comprise any other type, arrangement or number of components.

As shown in FIG. 1, an example memory system 15 includes a memory module 20 that comprises data buffers 30, memory devices 40, a registered clock driver (RCD) 50, a power management integrated circuit (PMIC) 60, a serial presence detect (SPD) hub 65, connectors 70, temperature sensors 75 and any other blocks, circuits, pins, connectors, traces or other component typically found in a memory module. While memory module 20 is described herein as comprising particular components, memory module 20 may also or alternatively comprise any other components commonly found in a memory module 20.

In some embodiments, data buffers 30 and memory devices 40 comprise SDRAM devices, chips or modules. In some embodiments, data buffers 30 and memory devices 40 also or alternatively comprise any other types of memory devices such as, e.g., SRAM, DRAM, MROM, PROM, EPROM and EEPROM.

PMIC 60 is configured to perform power management for memory module 20. For example, PMIC 60 may be configured to scale up or scale down voltages, perform DC-DC conversions or perform other similar power management operations. In some embodiments, PMIC 60 may comprise low-dropout regulators (LDOs), DC-DC converters such as, e.g., buck or boost converters, pulse-frequency modulation (PFM), pulse-width modulation (PWM), power field-effect transistors (FETs), real-time clocks (RTCs) or any other circuitry that may typically be found in a PMIC.

Connectors 70 may comprise, for example, pins, traces or other connections that are configured to connect memory module 20 to other components of a computing system such as, e.g., memory controller 80, motherboard, or other components. In some embodiments, connectors 70 may comprise, e.g., a 288-pin configuration or any other pin configuration.

In some embodiments, memory module 20 comprises connectors 70. In other embodiments, a motherboard, memory controller 80 or any other component of a computing device comprises connectors 70. In another embodiment, one or more of connectors 70 may be part of memory module 20 and one or more of connectors 70 may be part of the motherboard, memory controller 80 or other component of the computing device.

Memory module 20 may be connected to the motherboard, memory controller 80 or other component of the computing device, e.g., by connectors 70, to transfer data between components of the computing device and memory module 20. For example, in an embodiment that implements a UDIMM, connectors 70 may comprise a 64-bit bus, a 72-bit bus or any other bit-value bus.

Memory modules 20 is shown connected to memory controller 80 of the computing device. In an example embodiment, memory controller 80 may be implemented as a component of a computer motherboard, or main board, of the computing device, e.g., on a northbridge of the motherboard. In another example, memory controller 80 may be implemented as a component of a microprocessor of the computing device. In yet another example, memory controller 80 may be implemented as a component of a central processing unit (CPU) of the computing device. In other embodiments, memory controller 80 may be implemented as a part of any other component of the computing device.

In some embodiments, memory module 20 is implemented as a DDR5 SDRAM memory module. As an example, memory module 20 may comprise a memory module density of 128 gigabyte (GB), 512 GB, one terabyte (TB), or higher depending on the memory module. Memory module 20 may operate with a frequency of about 1.2 to about 3.2 giga-Hertz (GHz) and a data rate range of about 3.2 GT/s to about 4.6 GT/s and in some cases a data rate up to about 8 GT/s or more. In some embodiments, memory module 20 may alternatively comprise smaller or larger densities, operate at lower or higher frequencies and operate at lower or higher data rates.

With continued reference to FIG. 1, memory module 20 is shown communicating with memory controller 80. Memory controller 80 is shown as part of a circuit 90 such as, e.g., a motherboard, main board or other component of a computing device that communicates with memory module 20. Memory controller 80 is configured to generate a variety of signals including a clock signal (CLK), control signals (e.g., ADDR and CMD) and command signals. One or more of the CLK, ADDR and CMD signals may be provided to RCD 50, e.g., via one or more buses 23.

Signals from memory controller 80 may also be transmitted from memory controller 80 to PMIC 60 via a bus 24, also referred to herein as a host interface bus 24. In some embodiments, host interface bus 24 is bi-directional and is configured to communicate commands or other data between PMIC 60 and memory controller 80 or other components of memory module 20. The host interface bus 24 may implement an $I^2C$ protocol, an $I^3C$ protocol or any other protocol.

Signals from memory controller 80 may also be transmitted from memory controller 80 to SPD hub 65 via a bus 66, also referred to herein as a host interface bus 66. In some embodiments, host interface bus 66 is bi-directional and is configured to communicate commands or other data between SPD hub 65 and memory controller 80 or other components of memory module 20. Host interface bus 66 may implement an $I^2C$ protocol, an $I^3C$ protocol, a combination of $I^2C$ and $I^3C$ protocols or any other protocol or combination of protocols.

A data bus 72 may be connected between memory controller 80 and data buffers 30, and may comprise connectors 70, e.g., traces, pins and other connections, between memory controller 80 and data buffers 30. In some embodiments, memory controller 80 may also or alternatively be connected with memory devices 40 via data bus 72 and connectors 70.

RCD 50 is configured to communicate with memory controller 80, data buffers 30, memory channels (not shown), PMIC 60, SPD hub 65 and temperature sensors 75. RCD 50 is configured to decode instructions, e.g., control words, received from memory controller 80. For example, RCD 50 may be configured to receive and decode register command words (RCWs). In another example, RCD 50 may be configured to receive and decode buffer control words (BCWs). RCD 50 is configured to train one or more of data buffers 30, memory devices 40 and the command and buses 23 between RCD 50 and memory controller 80. For example, the RCWs may flow from memory controller 80 to the RCD 50 and be used to configure RCD 50.

In some embodiments, RCD 50 may implement a command/address register, e.g., a 32-bit 1:2 command/address register. RCD 50 may support an at-speed bus, e.g., a unidirectional buffer communications (BCOM) bus between RCD 50 and data buffers 30. In some embodiments, RCD 50 may implement one or more of automatic impedance calibration, command/address parity checking, control register RCW readback, a serial bus such as, e.g., a 1 MHz inter-integrated circuit ($I^2C$) bus, and a 12.5 MHz inter-integrated circuit ($I^3C$) bus. Inputs to RCD 50 may be pseudo-differential using one or more of external and internal voltages. The clock outputs, command/address outputs, control outputs and data buffer control outputs of RCD 50 may be enabled in groups and independently driven with different strengths.

RCD 50 is configured to receive the CLK, ADDR and CMD signals or other signals such as, e.g., RCWs and BCWs, from memory controller 80 and to utilize various digital logic components to generate corresponding output signals based on the CLK, ADDR and CMD signals. For example, RCD 50 is configured to generate corresponding signals such as, e.g., CLK', ADDR' and CMD' signals based on the received CLK, ADDR and CMD signals. The CLK', ADDR' and CMD' signals may be presented to memory devices 40. For example, the CLK' signals may be transmitted from RCD 50 to memory devices 40 on a common bus 25 and the ADDR' and CMD' signals may be transmitted from RCD 50 to memory devices 40 on a common bus 26. RCD 50 is also configured to generate one or more data buffer control (DBC) signals that are transmitted to data buffers 30, for example, on a common bus 27, also referred to herein as a data buffer control bus 27.

Data buffers 30 are configured to receive commands and data from the data buffer control bus 27 and to generate data, receive data or transmit data to and from data bus 72. Each data path also comprises a bus 28 between its data buffer 30 and memory devices 40 that is configured to carry the data between its data buffer 30 and memory devices 40.

Data buffers 30 are configured to buffer data on the buses 72 and 28 for write operations, e.g., data transfers from memory controller 80 to the corresponding memory channels, and read operations, e.g., data transfers from the corresponding memory channels to memory controller 80.

Entity 85 may comprise an SPD hub component provider, a DIMM provider, a system provider, a data center provider, a component manufacturer, or any other entity that services or produces some or all of the components of memory module 20. In illustrative embodiments, entity 85 comprises a plurality of entities 85 which could be a number of providers, servicers, or manufacturers, for example. In some embodiments, entity 85 comprises one or more computing devices comprising processors and memory that are configured to provide messages or commands to memory controller 80.

Figure 3:
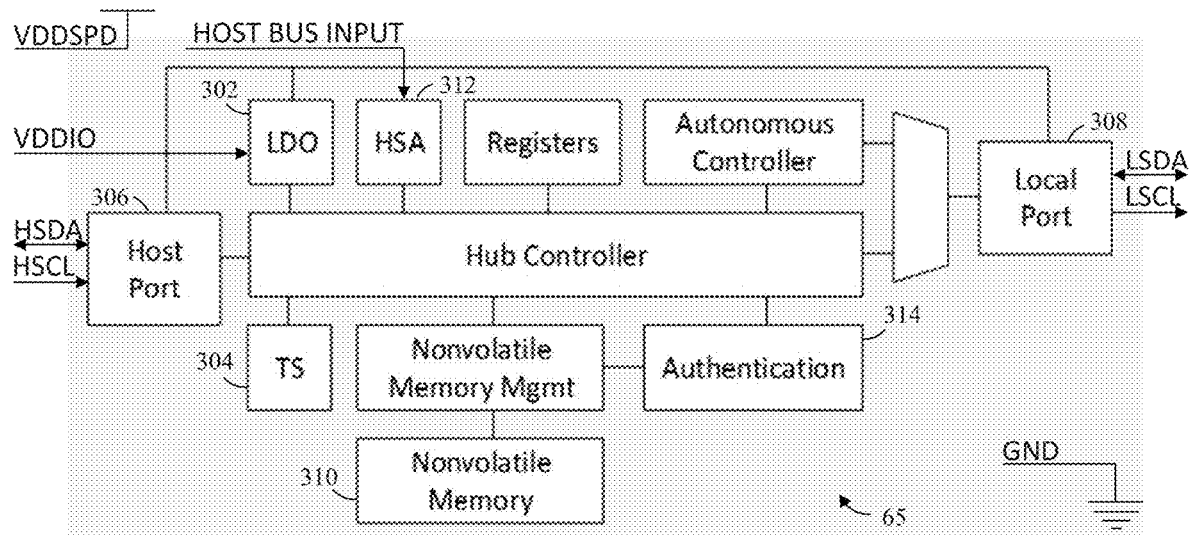
FIG. 3 is a block diagram of the example SPD hub of FIG. 2 according to an embodiment.

With reference now to FIGS. 2 and 3, SPD hub 65 will be described in more detail. In an illustrative embodiment, SPD hub 65 comprises a DDR5 Enhanced Serial Presence Detect EEPROM with Hub, Authentication, Security function, with an integrated temperature sensor as used for memory module applications, also sometimes referred to as an Enhanced SPD (ESPD) hub or a security hub. SPD hub 65 provides isolation of a local bus from a controller bus. In other embodiments SPD hub 65 may comprise functionality for use with other types of memory modules 20 or other types of devices.

In an illustrative embodiment, as shown in FIG. 2, SPD hub 65 comprises a 9-pin thermally enhanced DFN package including an LSDA pin (1), an HSDA pin (2), an HSCL pin (3), an LSCL pin (4), a VDDSPD pin (5), a GND pin (6), a VDDIO pin (7), an HSA pin (8) and a GND/Thermal Pad (9).

LSDA pin (1) is a local bus input/output (IO) pin that is configured for sending and receiving $I^2C/I3C$ data. HSDA pin (2) is a host bus IO pin that is configured for sending and receiving $I^2C/I3C$ basic data. HSCL pin (3) is a host bus input pin that is configured for receiving an $I^2C/I3C$ basic input clock. LSCL pin (4) is a local bus output pin that is configured for sending an $I^2C/I3C$ basic output clock. VDDSPD pin (5) is a power pin that is configured to receive an input power supply, e.g., a 1.8V input power supply in some embodiments. GND pin (6), also referred to as VSS, is a ground pin that is configured to connect to ground. VDDIO pin (7), also referred to as VIO, is a power pin that is configured to receive an input power supply, e.g., a 1.1V input power supply in some embodiments. HSA pin (8) is a host bus input pin that is configured for receiving $I^2C/I3C$ basic addresses. GND/Thermal Pad (9) is a ground pin connected to the ground plane. While pins 1-9 are described above as having a particular function, any of pins 1-9 may also or alternatively perform other functions. In some embodiments, a greater or smaller number of pins may also be utilized for SPD hub 65.

With reference to FIG. 3, SPD hub 65 comprises a voltage regulator such as, e.g., a low-dropout regulator (LDO) 302, a temperature sensor 304, an I²C/I3C interface comprising a host port 306 and a local port 308, non-volatile memory 310 such as, e.g., EEPROM, and HSA sensing circuitry 312. SPD hub 65 further comprises an authentication block 314 used by the system controller for challenge and challenge response as part of the authentication process, as discussed below.

HSA sensing circuitry 208 is configured to determine a resistance value on HSA pin (8) which is utilized by SPD hub 65 to determine a corresponding 3-bit host identifier (HID) address. For example, a resistance of 10.0KΩ may correspond to an HID of 000, a resistance of 15.4KΩ may correspond to an HID address of 001 and so on. In some embodiments, SPD hub 65 may be placed in an offline mode and write protection may be overridden by connecting HSA pin (8) to ground.

Figure 4:
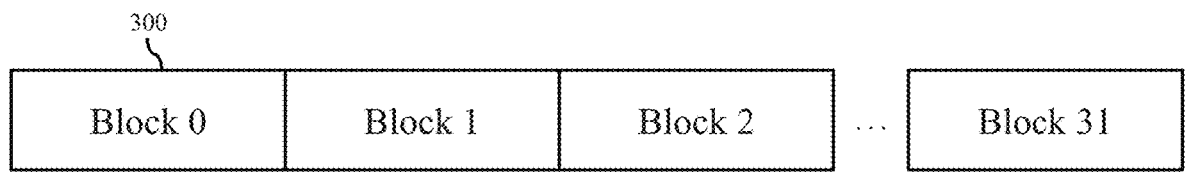
FIG. 4 is a block diagram of example memory blocks of the SPD hub of FIG. 2 according to an embodiment.
Figure 5:
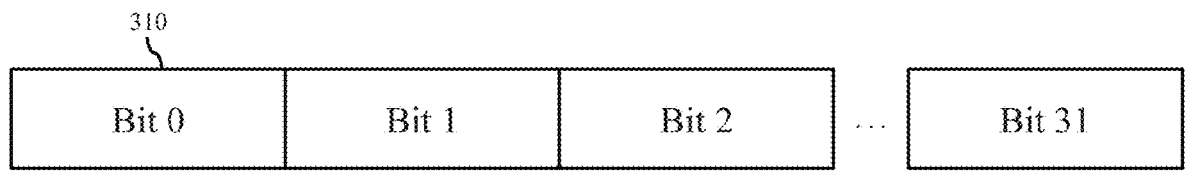
FIG. 5 is a block diagram of an example read and write protection data structure of the SPD hub of FIG. 2 according to an embodiment.

With reference to FIGS. 4 and 5, non-volatile memory 310 of SPD hub 65 comprises 2 KB of non-volatile memory 300 arranged as 32 blocks of 64 bytes per block for end use with each block of 64 bytes being optionally read or write protected via a software command. While described as comprising 2 KB of non-volatile memory arranged in 32 blocks of 64 bytes each, in other embodiments, any other amount of non-volatile memory arranged in any other manner may alternatively be utilized. For example, in some embodiments, SPD hub 65 is configured to separately set write protection for each block of memory 300 by setting a corresponding bit in a data structure 310 such as, e.g., a bitmap or other data structure, where each bit in data structure 310 corresponds to one of the blocks of memory 300. For example, a bit in data structure 310 may be set to 1 to indicate that the corresponding block is write protected and may be set to 0 to indicate that the corresponding block is not write protected, or vice versa. During normal run time operation, any of the bits in data structure 310 may be set, e.g., to 1, to enable write protection for the corresponding block. In some embodiments, the bits of data structure 310 may not be reset or cleared, e.g., set to 0, to remove write protection except as described in the illustrative embodiments below.

In an illustrative embodiment, an HSA pin method for removing write protection for the non-volatile memory 300 of SPD hub 65 will now be described.

In the HSA pin method, also mentioned above, SPD hub 65 uses the HSA pin (8) to determine whether or not the write protection bits in bitmap 310 may be cleared or overridden. As mentioned above, HSA pin (8) is tied to ground via a resistor value during normal run time operation to select a HID. When SPD hub 65 detects a resistance value on HSA pin (8) during power up, the clearing or overriding of the write protection bits in bitmap 310 is inhibited by SPD hub 65. Once write protected, the write protection for each block may be overridden in an offline programming environment such as a test bench, e.g., by connecting HSA pin (8) to ground. When SPD hub 65 detects that HSA pin (8) is connected to ground during power up, clearing or overriding bits in bitmap 310 is no longer inhibited and write protection for a block of memory 300 may be cleared or overridden, e.g., by setting the corresponding bit of bitmap 310 to 0. In some cases, the HSA pin method alone may have vulnerabilities. For example, even though removal or overriding of the write protection through the use of HSA pin (8) is inhibited during normal run time operation, the write protection may not be secure since any user can modify the blocks of memory 300 after a power up of SPD hub 65 once HSA pin (8) is connected to ground, e.g., in a test bench or offline environment.

In an illustrative embodiment, a security protocol method for removing write protection for the non-volatile memory 300 of SPD hub 65 will now be described. In some embodiments, the security protocol method may be utilized in addition to or in parallel with the HSA pin method. In some embodiments, the security protocol method may be utilized without enabling the HSA pin method, e.g., write protection may no longer be removed by connecting HSA pin (8) to ground in an offline or test bench environment and powering up SPD hub 65. In some embodiments, the HSA pin method may also require the security protocol method to enable overriding or clearing of corresponding blocks.

The security protocol method is an enhanced security method which uses a security protocol based on certificates that are installed in SPD hub 65 to manage and clear the read or write protection of blocks of memory 300. The security protocol method enables authorized users of SPD hub 65 to set and clear read or write protection during normal run time operation in a secure manner for blocks over which they have ownership. In the security protocol method, SPD hub 65 is not required to power up with HSA pin connected directly to ground without any resistor to clear the read or write protection and modify the content of memory 300. In addition, the security protocol method keeps the read or write protection over blocks set by other entities secure. For example, once an entity 85 sets the read or write protection of one or more blocks of memory 300, only that entity 85 can clear the read or write protection those same blocks during normal run time operation. No other entity 85 can clear the read or write protection of those blocks during normal run time operation.

Figure 6:
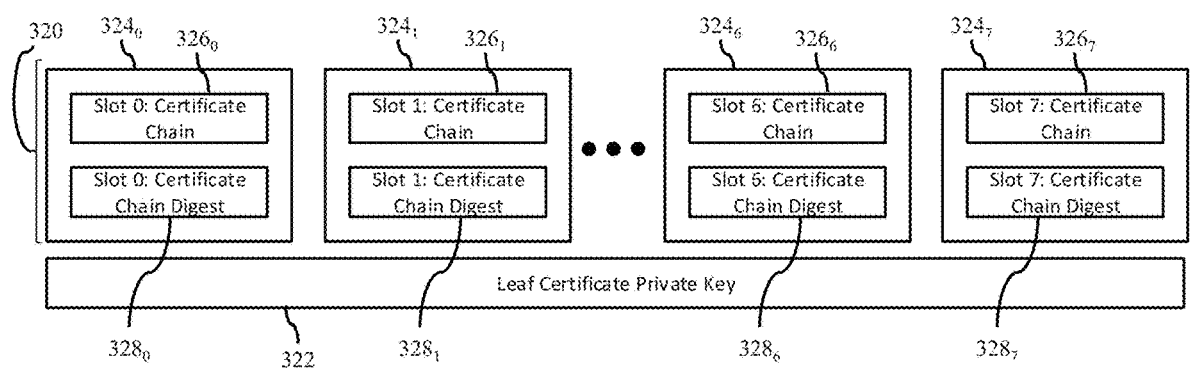
FIG. 6 is a block diagram of example memory slots of the SPD hub of FIG. 2 that are configured for storing certificate chains according to an embodiment.

As part of the security protocol method, with reference to FIG. 6, SPD hub 65 also comprises 16 KB of non-volatile immutable storage 320 that is configured to house certificate chains and an additional 1 KB of non-volatile immutable storage 322 that is configured to store the hash digest values and leaf private keys associated with each certificate chain. Storages 320 and 322 are in addition to the 2 KB of memory 300 mentioned above. In illustrative embodiments, the storages 320 and 322 are utilized for an authentication function of the security protocol method and may not be available for use by an end user. In other embodiments, an end user may be able to access some or all of the non-volatile immutable storage.

As shown in FIG. 6, storage 320 comprises eight slots $324_0$, $324_1$, ... $324_6$ and $324_7$, collectively and individually referred to herein as slot(s) 324, for storing certificate chains. In some embodiments, each slot 324 corresponds to and is configured to store a single respective certificate chain $326_0$, $326_1$, ... $326_6$ and $326_7$ and corresponding digest $328_0$, $328_1$, ... $328_6$ and $328_7$, collectively and individually referred to herein as certificate chain(s) 326 and digest(s) 328, respectively. While described as having eight slots, any other number of slots for storing certificate chains may alternatively be implemented by SPD hub 65.

In some embodiments, each certificate chain may comprise two certificates, three certificates, four certificates, five certificates or any other number of certificates. SPD hub 65 is configured to store its own certificate chain information in one of slots $324_0$, $324_1$, ... $324_6$ and $324_7$, e.g., in slot $324_0$ in some embodiments, where each certificate chain is allowed to be written or loaded only once. For example, once a certificate chain is loaded into a corresponding slot 324, it may be immutable where, for example, rewriting or modifying the certificate chain is not permitted by SPD hub 65.

In some embodiments, SPD hub 65 stores its certificate chain in slot $324_0$ and leaves the remaining seven slots 324 for other certificate chains. For example, in some embodiments, of the remaining seven slots 324, one slot 324 may be utilized by a DIMM provider, one slot 324 may be utilized by a system provider, one slot 324 may be utilized by a data center provider and the remaining slots 324 may be available for use in other purposes. For example, a remaining slot 324 may be used in the future in the event that a DIMM certificate chain or system certificate chain is revoked, and another certificate chain needs to be installed.

In some embodiments, the maximum size of each certificate in a certificate chain 326 is 800 Bytes. In other embodiments, other maximum sizes for certificates may alternatively be utilized. In a given certificate chain 326, the maximum storage that can be used is a function of the number of certificates in a certificate chain 326. For example, in some embodiments, there is not a fixed amount of storage space allocated for any certificate chain 326. Instead, for any given certificate chain 326, each certificate may be less than 800 Bytes and a certificate chain 326 may comprise any number of certificates. If one certificate chain 326 has a smaller certificate size or fewer certificates, more storage space is available for the remaining certificate chains 326.

In addition to the total certificate storage space of 16 KB, the SPD hub 65 comprises 64 Bytes of immutable storage for each slot 324 to store the digest 328 of the entire certificate chain 326. In addition, SPD hub 65 comprises 64 Bytes of immutable storage to store the leaf certificate private key. The leaf certificate key pair is common across all leaf certificates regardless of the slot 324. In some embodiments, the total immutable storage space in SPD hub 65 is 16 KB+8*64B+64B. In other embodiments, different amounts of storage space may alternatively be utilized. In illustrative embodiments, read access of the storage space where digest 328 is stored is allowed while read access of the 64 bytes of storage space where the leaf certificate private key is stored is not for users outside of SPD hub 65. For example, the leaf certificate private key remains private and is only accessible to SPD hub 65's internal logic.

Figure 7:
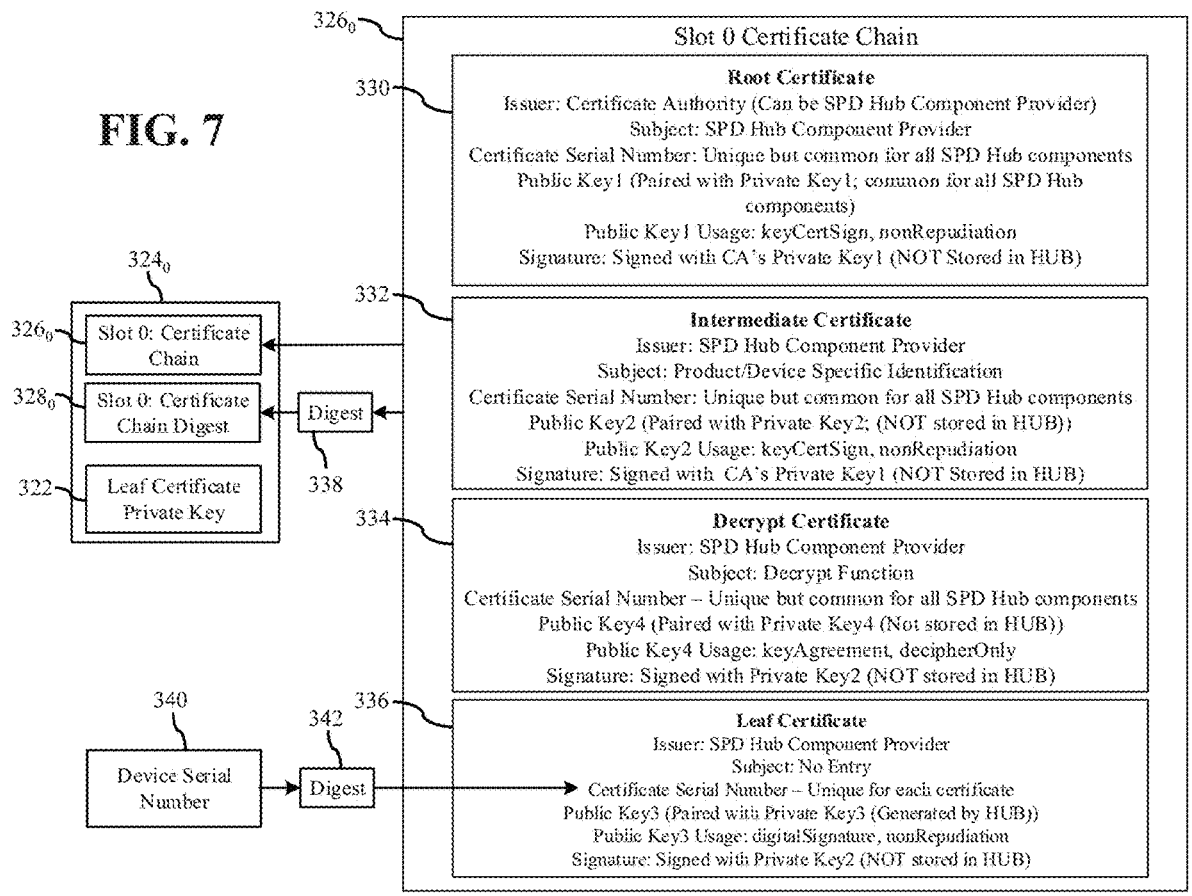
FIG. 7 is a block diagram of an example certificate chain stored in one of the memory slots of FIG. 6 according to an embodiment.

With reference now to FIG. 7, an example certificate chain $326_0$ that may be stored in slot $324_0$, e.g., by the SPD hub component provider, will now be described. In this embodiment, the certificate chain $326_0$ comprises a root certificate 330, an intermediate certificate 332, a decrypt certificate 334 and a leaf certificate 336.

Root certificate 330 is provided by a Trusted Certificate Authority (CA). In some embodiments, for example, the CA may comprise an external third-party CA. For example, root certificate 330 may be provided and signed by the third-party CA. In other embodiments, root certificate 330 may be provided by another entity 85, e.g., the SPD hub component provider or another entity. Root certificate 330 provides identification to the DIMM and system providers. In some embodiments, the name of the CA for root certificate 330 and its public key are provided to the DIMM and system providers in advance by the SPD Hub component provider.

A platform Root of Trust (RoT) security processor, e.g., integrated in a baseboard management controller (BMC) or another processing device, or a platform firmware/BIOS maintains the list of CAs including self-certified CAs for SPD Hub component providers and the public key associated with each of the CAs. Root certificate 330 has a unique serial number. For a given SPD Hub component provider, root certificate 330 may always be the same in some embodiments, e.g., the public key of the CA and serial number may be the same for all SPD Hub components. SPD hub 65 also uses the same root certificate 330 if it goes through device revision.

In association with root certificate 330, the CA generates a unique key pair known as Private Key1/Public Key1. Private Key1 remains private to the CA. In illustrative embodiments, Private Key1 is not stored inside SPD hub 65. Private Key1 is used to sign intermediate certificate 332 in certificate chain $326_0$. Public Key1 is advertised on root certificate 330 and is used by memory controller 80 to verify the signature of root certificate 330 and intermediate certificate 332. The issuer field of root certificate 330 is the CA and the subject field of root certificate 330 is the SPD Hub component provider.

Intermediate certificate 332 has a unique serial number. For a given SPD Hub component provider, the intermediate certificate 332 may be the same, including the public key and serial number, for all SPD Hub components within a device revision. SPD hub 65 may use the same or a different intermediate certificate if it goes through device revision.

In association with intermediate certificate 332, the SPD Hub component provider generates a unique key pair known as Private Key2/Public Key2. Private Key2 remains private to the SPD Hub component provider and in illustrative embodiments is not stored inside SPD hub 65. Public Key2 is also not stored in the SPD hub 65. In an illustrative embodiment, the Private Key2/Public Key2 pair is same for each SPD hub 65 within a device revision and may be the same or different for a different device revision. Private Key2 is used to sign decrypt certificate 334 and leaf certificate 336 in certificate chain $326_0$.

Public Key2 is advertised on intermediate certificate 332 and is used by memory controller 80 to verify the signature of decrypt certificate 334 and leaf certificate 336. Intermediate certificate 332 is signed by the CA's Private Key1 of root certificate 330. The issuer field of intermediate certificate 332 is the SPD Hub component provider. The subject field of intermediate certificate 332 carries product and device specific identification.

Decrypt certificate 334 is a unique certificate and in some embodiments is a common certificate for all SPD Hub components of a given SPD Hub component provider. Decrypt certificate 334 is utilized to indicate to SPD hub 65 that SPD hub 65 should use Public Key2 for certain function messages such as Key Management or Firmware Management which are signed.

In associate with decrypt certificate 334, the SPD hub component provider generates a unique key pair known as Private Key4/Public Key4. Private Key4 remains private to the SPD hub component provider. In illustrative embodiments, Private Key4 is not stored inside SPD hub 65.

Private Key4 is used to sign the function specific messages by memory controller 80. Public Key4 is advertised on decrypt certificate 334 and SPD hub 65 extracts Public Key4 from decrypt certificate 334 to decrypt the signature and validate messages prior to executing the messages. Decrypt certificate 334 is signed by Private Key2 of intermediate certificate 332. The issuer field of decrypt certificate 334 is the SPD Hub Component Provider. The subject field of decrypt certificate 334 is labeled as decrypt function in illustrative embodiments.

Leaf certificate 336 is a unique certificate for each SPD hub 65 that the SPD Hub component provider produces. Unlike root certificate 330 and intermediate certificate 332, leaf certificate 336 comprises a serial number that is unique for each SPD hub 65. The serial number for leaf certificate 336 is generated by the SPD Hub component provider. In some embodiments, the serial number for leaf certificate 336 is generated by performing a digest 342 of the serial number 340 of SPD hub 65 in order from the first byte to the fifth byte of a 40-bit SPD Hub component serial number.

In association with leaf certificate 336, SPD hub 65 generates a unique key pair known as Private Key3/Public Key3. Private Key3 remains private to SPD hub 65 and is stored inside SPD hub 65. Public Key3 is advertised on leaf certificate 336. This Private Key3/Public Key3 pair is used by all the leaf certificates in each slot for a given SPD hub 65 and is unique to each SPD hub 65. Leaf certificate 336 is signed by Private Key2 of intermediate certificate 332. The Private Key3/Public Key3 pair is used by the DIMM and system providers for challenge and challenge response as part of the authentication process for all slots 324. In illustrative embodiments, the issuer field of leaf certificate 336 is the SPD Hub component provider and the subject field of leaf certificate 336 does not carry any information.

A digest 338 of certificate chain $326_0$ is generated by SPD hub 65 and stored in digest 328 of slot $324_0$. Private Key3 of leaf certificate 336 is stored in storage 322 and is only accessible to SPD hub 65 internally.

Figure 8:
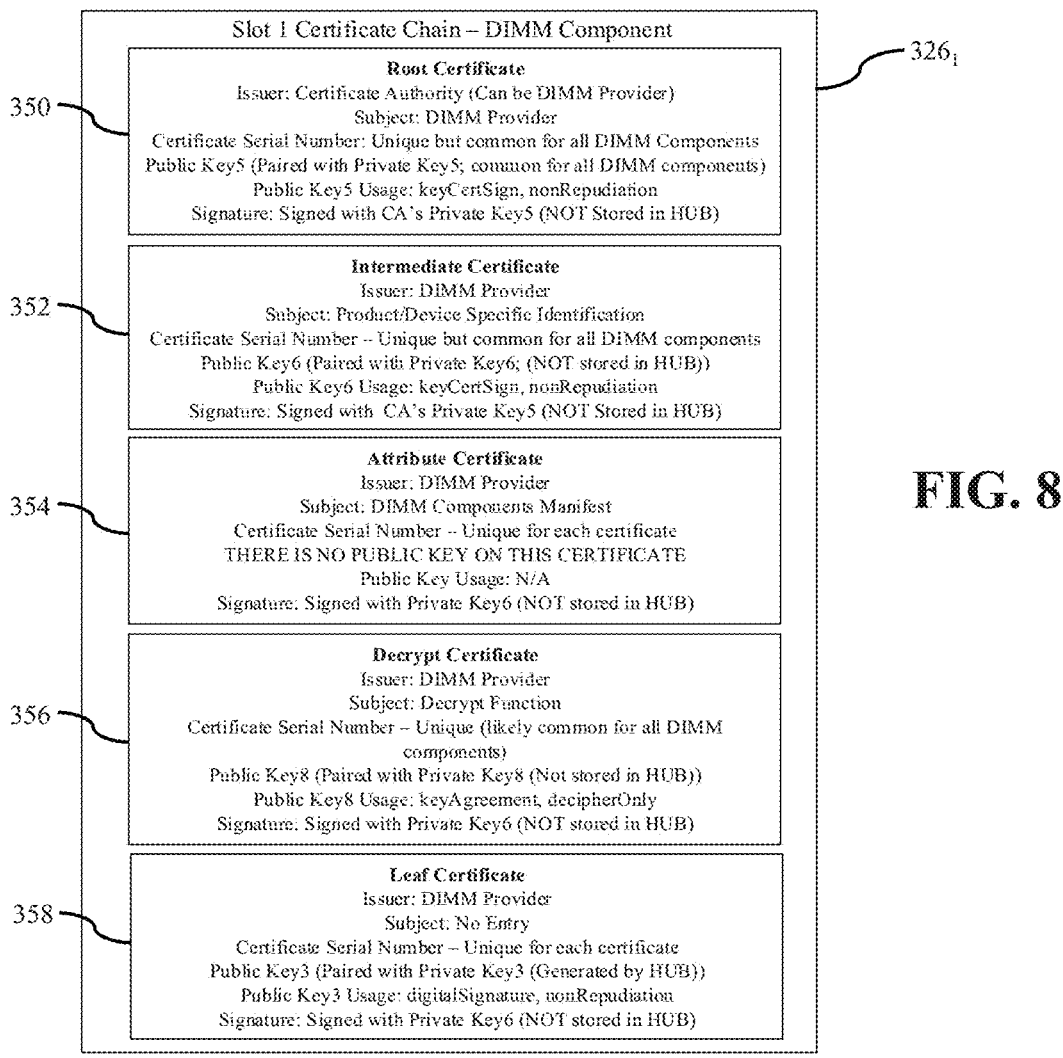
FIG. 8 is a block diagram of another example certificate chain stored in one of the memory slots of FIG. 6 according to an embodiment.

With reference now to FIG. 8, an example certificate chain $326_1$ that may be stored in slot $324_1$, e.g., by a DIMM provider, will now be described. As an example, SPD hub 65 may be provided to the DIMM provider by the SPD Hub component provider after the SPD Hub component provider has installed certificate chain $326_0$ in slot $324_0$. In this embodiment, certificate chain $326_1$ comprises a root certificate 350, an intermediate certificate 352, an attribute certificate 354, a decrypt certificate 356 and a leaf certificate 358.

Root certificate 350 is provided by a CA. In some embodiments, DIMM provider may act as the CA with root certificate 350 being self-certified and signed by the DIMM provider. In other embodiments, the DIMM provider may utilize an external third-party CA where root certificate 350 is provided and signed by the third-party CA.

The DIMM provider's root certificate 350 provides DIMM identification to the system provider. In some embodiments, the name of the CA for root certificate 350 and its public key are provided to the system provider in advance by the DIMM provider.

In some embodiments, the platform RoT security processor or platform firmware/BIOS may maintain a list of CAs, including the self-certified CAs, for the DIMM component providers and the public keys associated with each of the CA.

In an illustrative embodiment, root certificate 350 comprises a unique serial number where in some embodiments, for a given DIMM provider, the root certificate is same, e.g., Public Key of the CA, serial number, etc., for all DIMM components and various DIMM configurations, e.g., speed, rank, density, etc. In some embodiments, the DIMM component may also use the same root certificate 350 if it goes through a PCB revision.

In association with root certificate 350, the CA generates a unique key pair known as Private Key5/Public Key5. Private Key5 remains private to the CA, e.g., the DIMM provider in some embodiments. In illustrative embodiments, Private Key5 is not stored inside the SPD hub 65. In some embodiments, if the DIMM provider is acting as the CA, Private Key5 may only be known in a secure design/ATE (automated test equipment) environment. Private Key5 may also be utilized to sign intermediate certificate 352. Public Key5 is advertised on root certificate 350 and is used by memory controller 80 to verify the signature of root certificate 350 and intermediate certificate 352.

In illustrative embodiments, intermediate certificate 352 comprises a unique serial number. For a given DIMM provider, intermediate certificate 352 may be the same for all DIMM components. The DIMM provider may use the same or a different intermediate certificate 352 if it goes through a device revision.

In association with intermediate certificate 352, the DIMM provider generates a unique key pair known as Private Key6/Public Key6. Private Key6 may remain private to the DIMM provider and, in illustrative embodiments, is not stored inside SPD hub 65. In some embodiments, Public Key6 is also not stored in the SPD Hub component. Private Key6 is used to sign attribute certificate 354, decrypt certificate 356 and leaf certificate 358 in certificate chain $326_1$.

Public Key6 is advertised on intermediate certificate 352 and is used by memory controller 80 to verify the signature of attribute certificate 354, decrypt certificate 356 and leaf certificate 358. Intermediate certificate 352 is signed by the CA's Private Key5 of root certificate 350. In illustrative embodiments, the issuer field of intermediate certificate 352 is the DIMM provider and the subject field of intermediate certificate 352 carries component specific identification.

In some embodiments, attribute certificate 354 is a unique certificate for each DIMM component that a DIMM provider provides. Attribute certificate 354 comprises a serial number that is unique for each DIMM component and is generated by the DIMM provider. In an illustrative embodiment, attributed certificate 354 does not comprise a Private Key/Public Key pair. Attribute certificate 354 is signed by Private Key6 of intermediate certificate 352. The issuer field of attribute certificate 354 is the DIMM provider and the subject field of attribute certificate 354 is the DIMM Component manifest.

In an illustrative embodiment, decrypt certificate 356 is a unique certificate and is common for all DIMM components provided by a given DIMM provider. One purpose of decrypt certificate 356 is to indicate to SPD hub 65 that it should use its own Public Key for certain function messages such as Write Protect or Void Certificate Chain which are signed. Alternatively, another purpose of decrypt certificate 356 is to indicate to SPD hub 65 that it should use its own Public Key for other function messages such as Read Protect, which is signed.

In association with decrypt certificate 356, the DIMM provider generates a unique key pair known as Private Key8/Public Key8. In illustrative embodiments, Private Key8 remains private to the DIMM provider and is not stored inside the SPD hub 65. Private Key8 is used to sign the function specific messages by memory controller 80. SPD hub 65 decrypts the signature with the extracted Public Key8 to validate the messages prior to executing the messages. Public Key8 is advertised on decrypt certificate 356 and SPD hub 65 extracts Public Key8 from decrypt certificate 356. Decrypt certificate 356 is signed by Private Key6 of intermediate certificate 352.

In an illustrative embodiment, the issuer field of decrypt certificate 356 is the DIMM provider and the subject field of decrypt certificate 356 is labeled as decrypt function.

Leaf certificate 358 is a unique certificate for each DIMM component that the DIMM provider provides. Leaf certificate 358 comprises a serial number that is unique for each DIMM component. In an illustrative embodiment, Leaf certificate 358, which is stored in slot $324_1$ as part of certificate chain $326_1$, uses the same Private Key3/Public Key3 pair and serial number as leaf certificate 336 in certificate chain $326_0$ of slot $324_0$. The Private Key3/Public Key3 pair is used by the system controller for challenge and challenge response as part of the authentication process for all slots 324 including slot $324_1$. The DIMM provider extracts Public Key3 and the serial number of leaf certificate 336 from slot $324_0$ after it authenticates SPD hub 65 and then forms leaf certificate 358 for slot $324_1$. Leaf certificate 358 is signed by Private Key6 of intermediate certificate 352. In illustrative embodiments, the issuer field of leaf certificate 358 is the DIMM component provider and the subject field of leaf certificate 358 does not carry any information.

Figure 9:
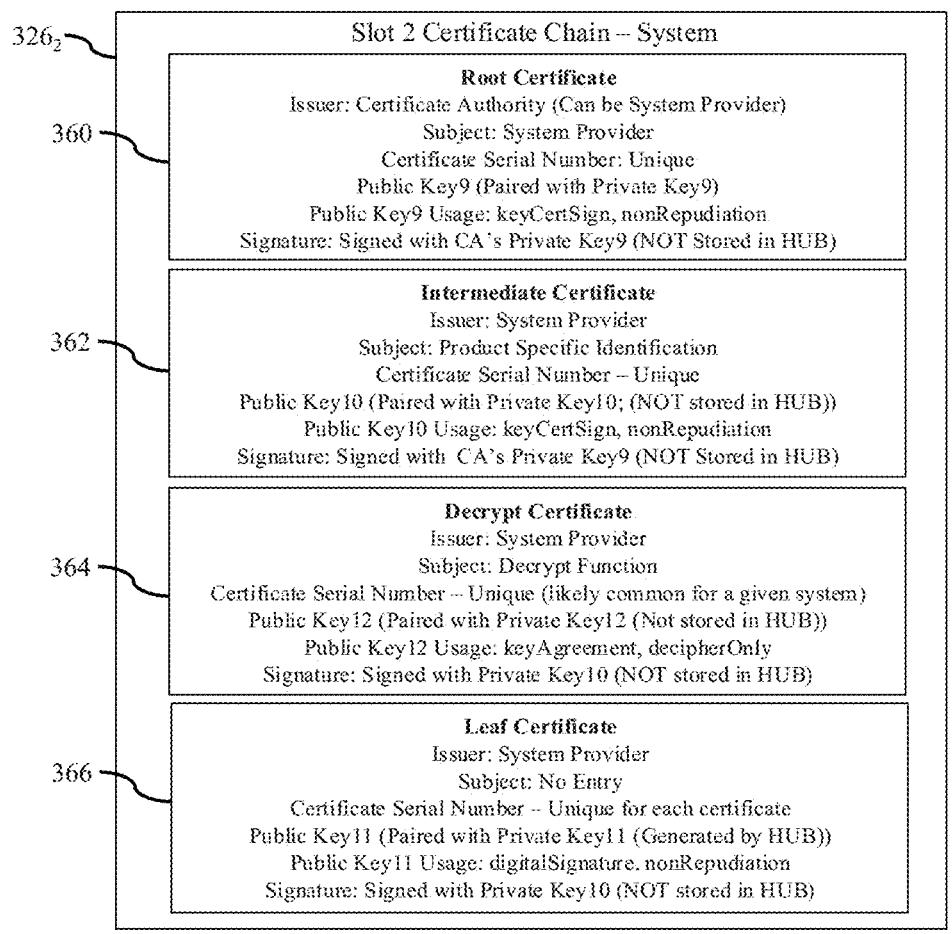
FIG. 9 is a block diagram of another example certificate chain stored in one of the memory slots of FIG. 6 according to an embodiment.

With reference now to FIG. 9, an example certificate chain $326_2$ that may be stored in another slot 324, e.g., by a system provider, will now be described. The system provider and the end user may each optionally create and install their own certificate chains 326. For example, the system provider may load certificate chain $326_2$ into an available slot 324. Similarly, the end user or other entities may load certificate chains into the remaining slots 324. The number of certificates in the certificate chain may be system provider specific. In some embodiments, for example, certificate chain $326_2$ comprises a root certificate 360, an intermediate certificate 362, a decrypt certificate 364 and a leaf certificate 366. In an illustrative embodiment, the private key(s) that are used to sign the certificates in certificate chain $326_2$ may remain private and are not loaded or stored in the SPD hub 65.

Root certificate 360 is provided by a CA. In some embodiments, root certificate 360 may be provided by the system provider which acts as the CA with root certificate 360 being self-certified and signed by the system provider. In other embodiments, the system provider may utilize an external third-party CA where root certificate 360 is provided and signed by the third-party CA.

Root certificate 360 provides DIMM identification to the system provider. The name of the CA for root certificate 360 and its public key may be known in advance by the system provider. In some embodiments, root certificate 360 has a unique serial number. In association with root certificate 360, the CA generates a unique key pair known as Private Key9/Public Key9. In some embodiments, Private Key9 remains private to the CA and is not stored inside the SPD hub 65. In some embodiments, if the system provider is acting as the CA, Private Key9 may be stored in a secure design/ATE environment.

Private Key9 is used to sign intermediate certificate 362 in certificate chain $326_2$. Public Key9 is advertised on root certificate 360 and is used by memory controller 80 to verify the signature of root certificate 360 and intermediate certificate 362. The issuer field of root certificate 360 is the CA and the subject field of root certificate 360 is the system provider. If the system provider is acting as the CA, the issuer and the subject field of root certificate 360 may both be the system provider itself.

In some embodiments, intermediate certificate 362 has a unique serial number. For a given system provider, intermediate certificate 362 is the same, e.g., Public Key and serial number, for all installed DIMM components. In association with intermediate certificate 362, the system provider generates a unique key pair known as Private Key10/Public Key10. In some embodiments, Private Key10 remains private to the system provider and is not stored inside the SPD hub 65. In some embodiments, Public Key10 is also not stored in SPD hub 65.

Private Key10 is used to sign decrypt certificate 364 and leaf certificate 366 in certificate chain $326_2$. Public Key10 is advertised on intermediate certificate 362 and is used by memory controller 80 to verify the signature of decrypt certificate 364 and leaf certificate 366. Intermediate certificate 362 is signed by Private Key9 of root certificate 360. The issuer field of intermediate certificate 362 is the system provider and the subject field of intermediate certificate 362 carries component specific identification.

In illustrative embodiments, decrypt certificate 364 is a unique certificate and is common for all DIMM components installed in a system by the given system provider. Decrypt certificate is utilized to indicate to SPD hub 65 that SPD hub 65 should use its public key for certain function messages such as Write Protect or Void Certificate Chain which are signed. Alternatively, decrypt certificate may be utilized to indicate to SPD hub 65 that SPD hub 65 should use its public key for other function messages such as Read Protect, which is signed.

In association with decrypt certificate 364, the system provider generates a unique key pair known as Private Key12/Public Key12. In some embodiments, Private Key12 remains private to the system provider and is not stored inside the SPD hub 65. Private Key12 is used to sign the function specific messages by memory controller 80. SPD hub 65 is configured to decrypt the signature with the extracted Public Key12 to validate the messages prior to executing the messages. Public Key12 is advertised on decrypt certificate 364 and SPD hub 65 is configured to extract Public Key12 from the decrypt certificate 364. Decrypt certificate 364 is signed by Private Key10 of intermediate certificate 362. The issuer field of decrypt certificate 364 is the system provider and the subject field of decrypt certificate 364 is labeled as decrypt function.

In illustrative embodiments, leaf certificate 366 is a unique certificate for each DIMM component that the system provider produces. Leaf certificate 366 comprises a serial number that is unique for each DIMM component. In some embodiments, leaf certificate 366 uses the same Private Key3/Public Key3 pair and serial number as leaf certificate 336 of slot $324_0$. Public Key3 is advertised on leaf certificate 366. The system provider extracts Public Key3 when it authenticates the SPD hub 65.

The Private Key3/Public Key3 pair is used by the system controller for challenge and challenge response as part of the authentication process for all slots 324 including slot $324_2$. The system provider extracts Public Key3 and the serial number of leaf certificate 336 from slot $324_0$ after it authenticates SPD hub 65 and then forms leaf certificate 366 for slot $324_2$. Leaf certificate 366 is signed by Private Key10 of intermediate certificate 362. In illustrative embodiments, the issuer field of leaf certificate 366 is the system component provider and the subject field of leaf certificate 366 does not carry any information.

While example certificate chains 326 are described above as having particular certificates, other certificates may also or alternatively be stored as part of a certificate chain 236 in slots $324_0$ through $324_7$ in other embodiments.

In some embodiments, SPD hub 65 enforces the following rules for write protection of memory 300. If the rules are violated, SPD hub 65 may be configured to report an error to memory controller 80. Memory controller 80 may then need to clear the error before proceeding to the next corrective action. Read protection of memory 300 may utilize the same technique to keep data secure such that no one else can read it, or to prevent access to configuration registers, for example.

Once the write protection of a block is set by one entity 85, other entities are no longer able to set or modify the write protection of the same block. This rule may also be applicable when write protection is set using the HSA pin method. For example, once the write protection of a block is set with either the HSA pin method or the security protocol method, the write protection must be cleared first by that method in order for another entity 85 to set their own write protection to the same block. In some embodiments, if the write protection of a block is set using the HSA pin method, then only the HSA pin method of powering on SPD hub 65 with HSA pin connected directly to ground can remove the write protection for that block. Similarly, if the write protection of a block is set using the security protocol method, then only the security protocol method can remove the write protection for that block. In this manner, the HSA pin method and the security protocol method may be used together simultaneously. When a block is write protected, SPD hub 65 will discard any write transactions to the protected blocks.

As part of the security protocol method, SPD hub 65 is configured to extract the public key of the decrypt certificate, e.g., public key4 in for certificate chain $326_0$, from the installed certificate chain 326 for each slot 324. The public key for each slot 324 is stored internally by SPD hub 65, e.g., in memory 300 or in another location.

With reference now to FIGS. 10 and 11, example formats for a request message 400 and a response message 500 will be described. Request message 400 may be provided to SPD hub 65 by memory controller 80 and is followed by a signature which provides authentication for request message 400. In some embodiments, each request message 400 is signed. In some embodiments, an exception to the signature may be made when the request message transmitted by memory controller 80 is a request to exit a set/clear write protection mode.

Request message 400 is signed by the private key associated with the decrypt certificate of the certificate chain 326 that is installed in the corresponding slot 324 for the entity 85 requesting a change to the write protection. SPD hub 65 validates the signature by using the corresponding public key of the decrypt certificate of the certificate chain 326 from that slot 324. In some embodiments, the SPD Hub response message does not carry the signature.

When memory controller 80 communicates an intention to set write protection to SPD hub 65 in request message 400, SPD hub 65 performs a number of determinations to check for message accuracy and validity. For example, SPD hub 65 may determine whether or not request message 400 indicates a slot 324 that comprises a valid certificate chain 326, SPD hub 65 may determine whether or not the requested slot 324 comprises a certificate chain 326 that matches entity 85 and corresponds to the requested blocks to be modified or cleared of write protection, SPD hub 65 may determine whether or not request message 400 has a valid signature or may make any other determination based on the received request message 400. As an example, if request message 400 is submitted by memory controller 80 and indicates blocks that are associated with the DIMM provider but requests a slot 324 that corresponds to the certificate chain 326 of the system provider or an end, SPD hub 65 may determine that there is a mismatch in request message 400. In an illustrative embodiment, the validation of the signature may be explicit to request message 400 where, for example, following request messages 400 may also need to be validated.

If SPD hub 65 determines that all of the checks are successful or valid, SPD hub 65 generates a response message 500. In some embodiments, to prevent blind replay attacks, response message 500 comprises a unique nonce that may be utilized to validate following request message 400. SPD hub 65 returns response message 500 including the nonce and current block status to memory controller 80. SPD hub 65 may also temporarily store the generated nonce in its internal storage for later comparison. In an illustrative embodiment, each generated nonce is used only once by SPD hub 65 and is automatically cleared by SPD hub 65 after it has been used to validate a following request message received from memory controller 80. SPD hub 65 uses the nonce to compare to a corresponding nonce provided by memory controller 80 when memory controller 80 sends the following request message 400 comprising the command to set or clear the write protection. In some embodiments, the nonce is also cleared automatically even if SPD hub 65 does not use it, e.g., when it receives an exit set/clear write protect mode message which in some embodiments may not require validation.

If one or more checks result in an error, SPD hub 65 flags an appropriate error, clears the nonce and sends an error message. In some embodiments, no further operation may be allowed by SPD hub 65 until the error flag is explicitly cleared by memory controller 80. Memory controller 80 may then submit a new request message 400 and revalidate.

The following request message 400 comprises a command to set or clear write protection for corresponding blocks and is signed by the private key of the corresponding entity 85. When SPD hub 65 receives the following request message 400, SPD hub 65 performs one or more checks to determine the accuracy and validity of the following request message 400. For example, SPD hub 65 may determine whether or not the following request message 400 has the same information as the original request message 400, e.g., in parameter 1 and parameter 2 aside from the command. As another example, SPD hub 65 may determine whether or not the following request message 400 comprises a command to set write protection of blocks that are already write protected. As another example, SPD hub 65 may determine whether or not the following request message 400 comprises the same nonce that was provided to memory controller 80 by SPD hub 65 in response message 500. As another example, SPD hub 65 may determine whether or not the following request message 400 comprises a valid signature. Any of the above checks or additional or alternative checks may be utilized alone or in combination by SPD hub 65 to verify the accuracy and validity of the following request message 400.

If all checks are successful, SPD hub 65 clears the nonce from its internal temporary storage, executes the command to write data to memory for the appropriate blocks, sets the write protection for the blocks, updates any relevant status registers, updates appropriate status registers and returns a response message 500 indicating successful completion.

If one or more of the checks results in an error, SPD Hub 65 flags an appropriate error, clears the nonce and sends an error message to memory controller 80. In some embodiments, no further operation may be allowed by SPD hub 65 until the error flag is explicitly cleared by memory controller 80.

Memory controller 80 then sends a request message to SPD hub 65 commanding SPD hub 65 to exit from the from the set/clear write protect mode. SPD hub 65 returns a response message confirming the exit and memory controller 80 resumes normal run time operation. In some embodiments, the request message to exit from the from the set/clear write protect mode does not need to be signed and validated.

In some embodiments, an entity 85 such as, e.g., the SPD hub provider, DIMM provider, system provider or any other entity may wish to void or nullify their corresponding certificate chain 326. In some embodiments, only the entity 85 that installed the corresponding certificate chain 326 in a given slot 324 can void the certificate chain 326 for that slot 324. For example, SPD hub 65 may be configured to ensure that an entity 85 such as, e.g., the SPD hub component provider, the DIMM provider, the system provider or any other entity, cannot void the certificate chain 326 that is not owned by that entity 85.

In some embodiments, if the SPD hub component certificate chain 326 is voided, the associated public/private key pair of the leaf certificate 336 is also voided. This means that if there are other certificate chains 326 installed in other slots 324 for other entities, those certificate chains 326 are not automatically voided but will no longer function since the leaf certificate private/public key pair is common across all slots 324. If a new SPD Hub component certificate chain 326 is loaded in another slot, e.g., other than slot 0, the other certificate chains may also need to be reinstalled.

In some embodiments, the write protection of a block of memory 300 may be set at any time when the SPD hub 65 is powered with HSA pin connected to ground with a resistor.

Figure 12:
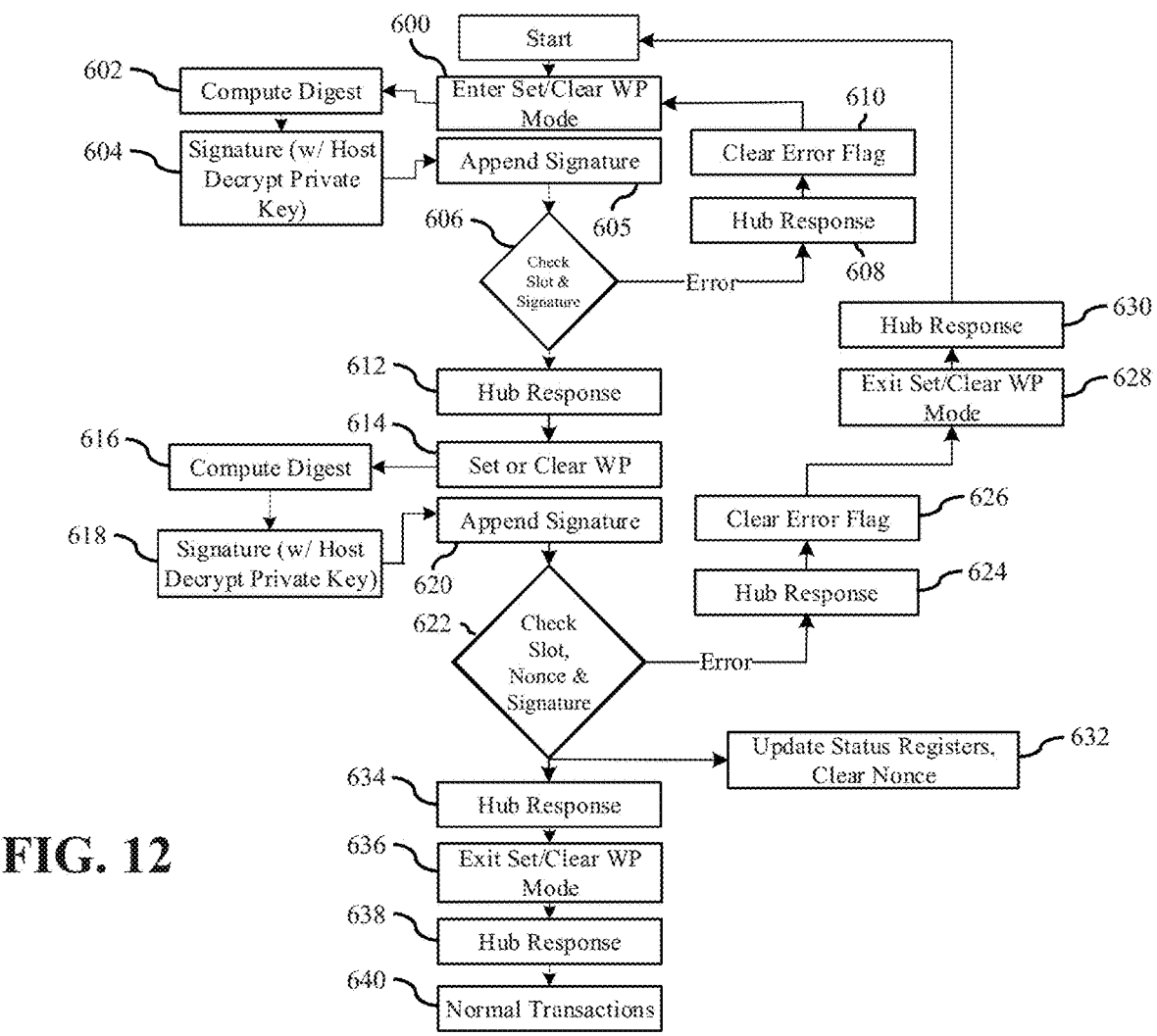
FIG. 12 is a flow diagram of an example process for setting and clearing write protection of blocks of the SPD hub of FIG. 2 according to an embodiment.

With reference to FIG. 12, an example process for setting write protection will be described. The process of FIG. 12 comprises steps 600 through 640.

At step 600, an entity 85 requesting to set or clear write protection generates a request message, e.g., using the format of request message 400 (FIG. 10). The request message comprises a command to enter the set/clear write protection mode.

At step 602, entity 85 computes a digest 328 for the request message.

At step 604, entity 85 generates a signature based at least in part on the digest using its decrypt private key.

At step 605, entity 85 appends the signature to the request message and sends the request message including the signature to memory controller 80. Memory controller 80 provides the request message along with the appended signature to SPD hub 65. In some embodiments, the request message may include a nonce.

At step 606, SPD hub 65 checks the slot and signature for validity, e.g., by using the public key of the certificate chain found in the slot to validate the signature.

If any of the slot and signature of entity 85 are not valid, SPD hub 65 responds to memory controller 80 at step 608 with an error message. In some embodiments, the process does not continue until memory controller 80 or entity 85 clears an error flag at step 610 and the process then returns to step 600.

If the slot and signature of entity 85 are valid, SPD hub 65 responds to the request message with a response message, e.g., in the format of response message 500 (FIG. 11), and provides a nonce to memory controller 80 at step 612. Memory controller 80 provides the response and nonce to entity 85.

At step 614, entity 85 generates a command message, e.g., in the format of request message 400, comprising a command to set or clear the write protection for one or more blocks. The command message comprises the same nonce that SPD hub 65 provided to memory controller 80 in response to the request message.

At step 616, entity 85 computes a digest for its the command message.

At step 618, entity 85 generates a signature based at least in part on the digest using its decrypt private key.

At step 620, entity 85 appends the signature to the command message and sends the command message including the signature to memory controller 80. Memory controller 80 provides the command message along with the appended signature to SPD hub 65.

At step 622, SPD hub 65 checks the slot and signature included with the command message for validity, e.g., using the certificate chain corresponding to the command message. SPD hub 65 also confirms that the nonce received with the command message is the same as the nonce provided by SPD hub 65 in the response to the request message.

If any of the slot, signature and nonce are not valid, SPD hub 65 responds to memory controller 80 with an error message and sets an error flag at step 624. In some embodiments, the process does not continue until memory controller 80 or entity 85 clears the error flag at step 626 and the process proceeds to step 628. At step 628, SPD hub 65 exits the set/clear write protection mode and provides a response to memory controller 80, e.g., in the format of response message 500 (FIG. 11), indicating that the set/clear write protection mode has been exited at step 630. The process then returns to the start and proceeds again to step 600.

Returning to step 622, if the slot, signature and nonce are valid, SPD hub 65 executes the command at step 632, e.g., by updating the status registers for the corresponding blocks and clearing the nonce, and also provides a response to memory controller 80, e.g., in the format of response message 500, at step 634 indicating the successful completion of the command.

At step 636, entity 85 generates an exit set/clear write protection mode message, e.g., in the format of request message 400, comprising a command to exit the set/clear write protection mode and sends the exit set/clear write protection mode message to memory controller 80. Memory controller 80 provides the exit set/clear write protection mode message to SPD hub 65. In some embodiments, the exit set/clear write protection mode message may be signed by a signature. In some embodiments, no signature is needed for the exit set/clear write protection mode message.

At step 638, SPD hub 65 exits the set/clear write protection mode based at least in part on the exit set/clear write protection mode message and provides a response to memory controller 80 e.g., in the format of response message 500, indicating that the set/clear write protection mode has been exited.

At step 640, entity 85, memory controller 80 and SPD hub 65 return to normal run time operation.

While the above example process is described as having particular steps or steps in a particular order, in other embodiments only some of the steps may be performed or the steps may be performed in any other order.

Figure 13:
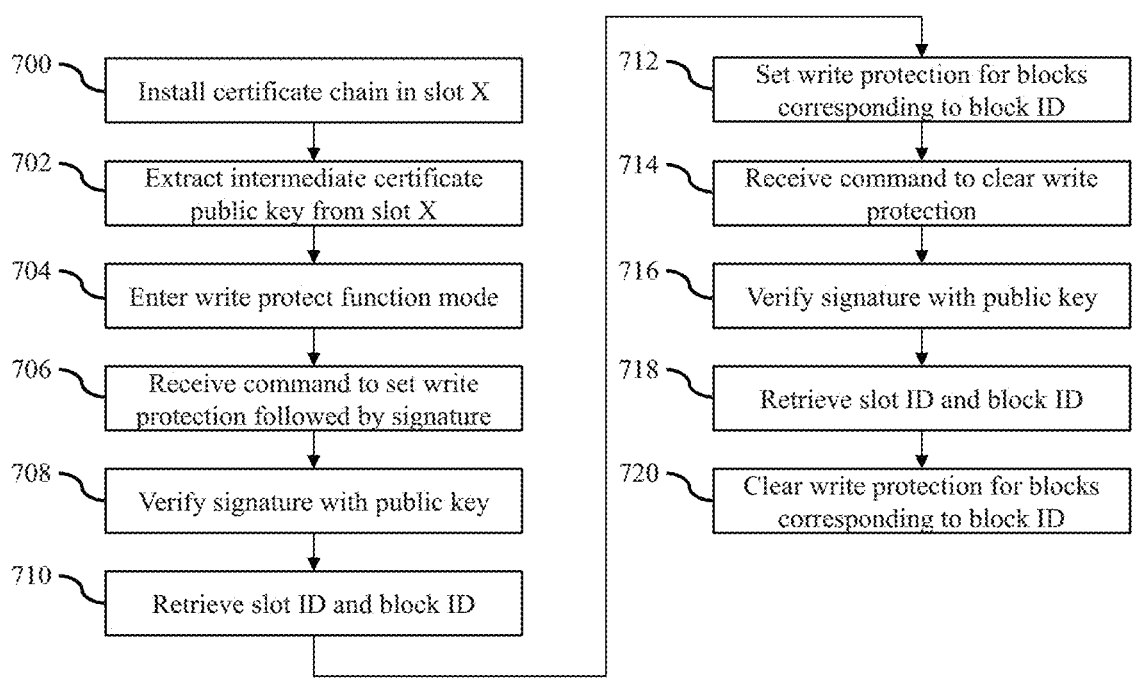
FIG. 13 is a flow diagram of another example process for setting and clearing write protection of blocks of the SPD hub of FIG. 2 according to an embodiment.

With reference now to FIG. 13 an example process for setting and clearing write protection according to an illustrative embodiment is described. The process of FIG. 13 comprises steps 700 through 720.

At step 700, SPD hub 65 installs a certificate chain in slot X, for example as described above.

At step 702, SPD hub 65 extracts the public key from the intermediate certificate of the certificate chain stored in slot X.

At step 704, SPD hub 65 enters write protection mode, e.g., in response to a request to enter write protection mode received from memory controller 80.

At step 706, SPD hub 65 receives a command to set write protection followed by a signature, e.g., from memory controller 80.

At step 708, SPD hub 65 verifies the signature using the extracted public key.

At step 710, SPD hub 65 retrieves a slot ID and a block ID from the command to set write protection.

At step 712, SPD hub 65 sets write protection for the blocks corresponding to the retrieved block ID, e.g., using the signature chain stored in the slot ID, e.g., slot X. Once set, the write protection may only be cleared by entity 85 that installed the signature chain stored in the slot ID, e.g., slot X.

At step 714, SPD hub 65 receives a command to clear write protection, e.g., from memory controller 80.

At step 716, SPD hub 65 verifies a signature of the command to clear write protection using the extracted public key.

At step 718, SPD hub 65 retrieves a slot ID and a block ID from the command to clear write protection.

At step 720, SPD hub 65 clears the write protection for the blocks corresponding to block ID.

While the above example process is described as having particular steps or steps in a particular order, in other embodiments only some of the steps may be performed or the steps may be performed in any other order.

Figure 14:
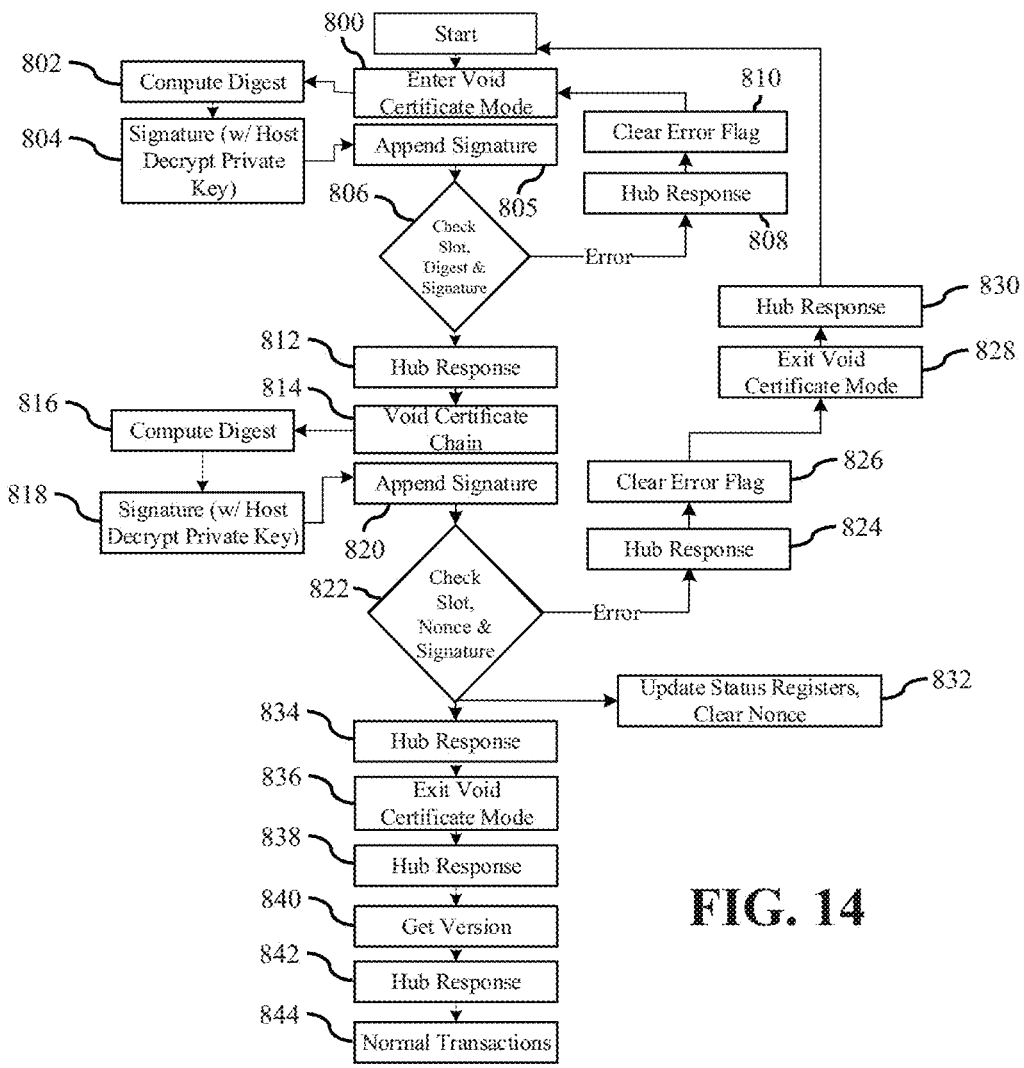
FIG. 14 is a flow diagram of an example process for voiding a certificate chain of the SPD hub of FIG. 2 according to an embodiment.

With reference now to FIG. 14 an example process for voiding a certificate according to an illustrative embodiment is described. The process of FIG. 14 comprises steps 800 through 844.

At step 800, an entity 85 requesting to void a certificate generates a request message, e.g., using the format of request message 400 (FIG. 10). The request message comprises a command to enter the void certificate mode.

At step 802, entity 85 computes a digest 328 for the request message.

At step 804, entity 85 generates a signature based at least in part on the digest using its decrypt private key.

At step 805, entity 85 appends the signature to the request message and sends the request message including the signature to memory controller 80. Memory controller 80 provides the request message along with the appended signature to SPD hub 65. In some embodiments, the request message may include a nonce.

At step 806, SPD hub 65 checks the slot, digest and signature for validity, e.g., by using the public key of the certificate chain found in the slot to validate the digest and signature. For example, SPD hub 65 may determine whether or not a valid certificate chain installed in the specified slot, whether or not the slot certificate chain entity ID matches with the entity type in the request message, whether or not the digest value of the specified slot in the request message matches with the internally stored digest value of the specified slot, whether or not the controller request message signature is valid or may make any other determination.

If the slot, digest and signature of entity 85 are not valid, SPD hub 65 responds to memory controller 80 at step 808 with an error message. In some embodiments, the process does not continue until memory controller 80 or entity 85 clears an error flag at step 810 and the process then returns to step 800.

If the slot, digest and signature of entity 85 are valid, SPD hub 65 responds to the request message with a response message, e.g., in the format of response message 500 (FIG. 11), and provides a nonce to memory controller 80 at step 812. Memory controller 80 provides the response and nonce to entity 85.

At step 814, entity 85 generates a command message, e.g., in the format of request message 400, comprising a command to void the certificate chain 326 for one or more slots 324. The command comprises the same nonce that SPD hub 65 provided to memory controller 80 in response to the request message.

At step 816, entity 85 computes a digest for its the command message.

At step 818, entity 85 generates a signature based at least in part on the digest using its decrypt private key.

At step 820, entity 85 appends the signature to the command message and sends the command message including the signature to memory controller 80. Memory controller 80 provides the command message along with the appended signature to SPD hub 65.

At step 822, SPD hub 65 checks the slot and signature included with the command message for validity, e.g., using the certificate chain corresponding to the command message. SPD hub 65 also confirms that the nonce received with the command message is the same as the nonce provided by SPD hub 65 in the response to the request message. For example, SPD hub 65 may determine whether or not the command message indicates the same information as communicated during the request message, whether or not the digest value of the specified slot in the command message matches with the internally stored digest value of the specified slot, whether or not the command message indicates the same nonce that SPD Hub 65 generated in response to the request message, whether or not command message signature is valid or any other determination.

If any of the slot, signature and nonce are not valid, SPD hub 65 responds to memory controller 80 with an error message and sets an error flag at step 824. In some embodiments, the process does not continue until memory controller 80 or entity 85 clears the error flag at step 826 and the process proceeds to step 828.

At step 828, SPD hub 65 exits the void certificate mode and provides a response to memory controller 80, e.g., in the format of response message 500 (FIG. 11), indicating that the void certificate mode has been exited at step 830. The process then returns to the start and proceeds again to step 800.

Returning to step 822, if the slot, signature and nonce are valid, SPD hub 65 executes the command at step 832, e.g., by voiding the certificate chain 326 for the corresponding slot 324 and clearing the nonce, and also provides a response to memory controller 80, e.g., in the format of response message 500, at step 834 indicating the successful completion of the command. As an example, the certificate chain 326 may be voided by clearing or deleting the certificate chain, overwriting the certificate chain with a predetermined value, e.g., all 0s, all 1s or another pattern, or in any other manner.

At step 836, entity 85 generates an exit void certificate mode message, e.g., in the format of request message 400, comprising a command to exit the void certificate mode and sends the exit void certificate mode message to memory controller 80. Memory controller 80 provides the exit void certificate mode message to SPD hub 65. In some embodiments, the exit void certificate mode message may be signed by a signature. In some embodiments, no signature is needed for the exit void certificate mode message.

At step 838, SPD hub 65 exits the void certificate mode based at least in part on the exit void certificate mode message and provides a response to memory controller 80 e.g., in the format of response message 500, indicating that the void certificate mode message has been exited.

At step 840, entity 85 generates a get version message, e.g., in the format of request message 400, comprising a command to get a version and sends the get version message to memory controller 80. Memory controller 80 provides the get version message to SPD hub 65.

At step 842, SPD hub 65 obtains the version and provides a response to memory controller 80, e.g., in the format of response message 500, including the version.

At step 844, entity 85, memory controller 80 and SPD hub 65 return to normal run time operation.

While the above example process is described as having particular steps or steps in a particular order, in other embodiments only some of the steps may be performed or the steps may be performed in any other order.

In some embodiments, the firmware may be protected in a similar manner to the write protection. For example, to inhibit malicious firmware updates or modifications to the firmware by entities other than an authorized entity, a process based on certificate chain authentication may be utilized to validate firmware updates or modifications.

In some embodiments, the firmware update process may comprise multiple layers including, for example, placing SPD hub 65 into a firmware management mode and performing the firmware update operation. In illustrative embodiments, the messages to place SPD hub 65 into firmware management mode and the messages to perform the firmware update process may comprise two different SPDM messages to ensure validity in the firmware update. For example, in some embodiments, SPD hub 65 may need to receive a message comprising a command to enter the firmware management mode first in order to enable the receipt of a firmware update message.

In an illustrative embodiment, firmware updates may only be allowed based on the certificate chain of SPD hub 65 installed in slot 0, e.g., by the SPD hub component provider. In other embodiments, other particular entities may have authorization to perform a firmware update.

Figure 15:
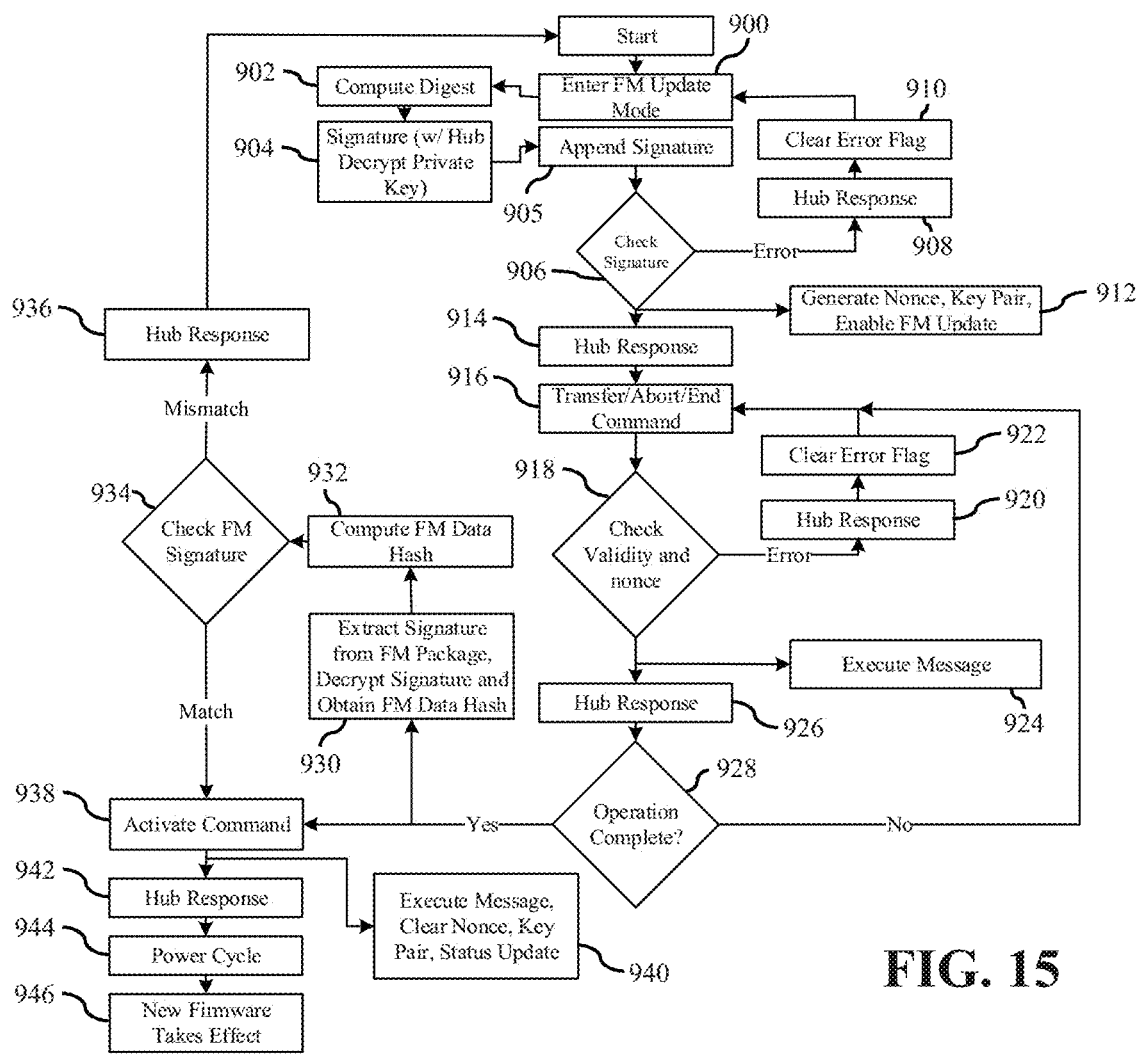
FIG. 15 is a flow diagram of an example process for updating the firmware of the SPD hub of FIG. 2 according to an embodiment.

With reference now to FIG. 15 an example process for performing a firmware update for SPD hub 65 according to an illustrative embodiment is described. The process of FIG. 15 comprises steps 900 through 946.

At step 900, an entity 85 requesting to perform a firmware update, e.g., the SPD hub component provider in an illustrative embodiment, generates a firmware management mode request message, e.g., using the format of request message 400 (FIG. 10). The firmware management mode request message comprises a command to enter the firmware management mode. In some embodiments, the firmware management mode request message also comprises an opaque data field that is configured to cause SPD hub 65 to generate a new private/public key pair (at step 906) based on a data input included in this field. SPD Hub is configured to use the new public key to decrypt firmware update messages and to authenticate the firmware image. The private key is not used by SPD hub 65 and remains private or is deleted.

At step 902, entity 85 computes a digest 328 for the request message.

At step 904, entity 85 generates a signature based at least in part on the digest using its decrypt private key, in this case, the private key corresponding to the certificate chain 326 installed in slot 0 by the SPD hub component provider.

At step 905, entity 85 appends the signature to the firmware management mode request message and sends the firmware management mode request message including the signature to memory controller 80. Memory controller 80 provides the firmware management mode request message along with the appended signature to SPD hub 65. In some embodiments, memory controller also generates and provides a nonce with the firmware management mode request message, e.g., in the payload. Memory controller 80 also generates the same private/public key pair as SPD hub 65 based on the same data input of the opaque data field. Memory controller 80 is configured to utilize the new private key to sign later firmware update messages.

At step 906, SPD hub 65 checks the signature for validity, e.g., by using the public key of the decrypt certificate of the certificate chain 326 found in slot 0 to validate the signature.

If the signature is not valid, SPD hub 65 responds to memory controller 80 at step 908 with an error message. In some embodiments, the process does not continue until memory controller 80 or entity 85 clears an error flag at step 910 and the process then returns to step 900.

If the signature is valid, SPD hub 65 generates a nonce, the new private/public key pair and enables acceptance of firmware updates by entering the firmware update mode at step 912.

SPD hub 65 also responds to memory controller 80 with a response message, e.g., in the format of response message 500 (FIG. 11), that includes the nonce, a current active firmware slot status and revision number at step 914. Memory controller 80 provides the response message and nonce to entity 85. SPD hub 65 stores the newly generated nonce and the public/private key pair in its internal temporary storage. The nonce is used for subsequent firmware update messages until the new firmware is activated or SPD hub 65 exits from the firmware management mode. For example, in some embodiments, SPD hub 65 is configured to automatically clear the nonce and the new public/private key pair once the new firmware is activated or SPD hub 65 exits from the firmware management mode. In some embodiments, the activation of new firmware automatically exits SPD Hub 65 from the firmware management mode.

In some embodiments, SPD Hub 65 carries two slots for firmware although any other number of slots may alternatively be used. The slots comprise an active slot and a future update slot. The active slot contains the firmware that is currently running on SPD hub 65. The future update slot is where new firmware is loaded. Once the new firmware is activated, the future update slot becomes the active slot and the active slot becomes the future update slot. The firmware size can vary depending on the attributes of SPD hub 65 and in some cases may comprise a large data size.

At step 916, entity 85 may initiate a firmware load operation by submitting a firmware update message to memory controller 80, e.g., in the format of request message 400 (FIG. 10), that comprises a full firmware transfer command, a partial firmware transfer command, an end firmware transfer command or another firmware transfer command. The firmware update message also comprises the nonce that was generated by SPD hub 65 at step 912. Memory controller 80 provides the firmware update message to SPD hub 65.

As an example, the partial or full firmware transfer command may be included in a first firmware update message, the partial or end firmware transfer command may be included in a second or subsequent firmware transfer message and the end firmware transfer command may be included in a final firmware transfer message once the firmware data transfer has been completed and the firmware data is installed into the future update slot. The end firmware transfer command may be configured trigger SPD Hub 65 to authenticate the newly installed firmware. The firmware package carries the firmware data plus a signature that is generated by memory controller 80 using the new private key generated by the memory controller 80 based on the data input of the opaque data field. In some embodiments, the signature is the hash value of the entire firmware data which is signed by the private key.

At step 918, SPD hub 65 checks the signature and nonce for validity using the new public key that it generated using the data input from the opaque data field. In illustrative embodiments, the firmware update message is only accepted by SPD Hub 65 after memory controller 80 has sent the firmware management mode request message with valid signature and SPD Hub 65 successfully verifies the signature. Without this verification, the firmware update message is returned with an error message back to memory controller 80.

If any of the signature and nonce are not valid, SPD hub 65 responds to memory controller 80 with an error message and sets an error flag at step 920. In some embodiments, the process does not continue until memory controller 80 or entity 85 clears the error flag at step 922 and the process returns to step 916.

Returning to step 918, if the signature and nonce are valid, SPD hub 65 executes the firmware update message at step 924, e.g., by executing the partial firmware command, full firmware transfer command or end firmware transfer command, and also provides a response to memory controller 80, e.g., in the format of response message 500, at step 926 indicating the successful execution of the firmware transfer command found in the firmware update message.

At step 928, entity 85 determines whether or not the firmware transfer operation is complete. If the firmware transfer operation is not complete, e.g., the firmware transfer is still in progress, the process returns to step 916 and entity 85 generates a new firmware update message comprising the partial firmware transfer command or, if the firmware data has been fully transferred, the end firmware transfer command. The process then continues again to step 918.

If the firmware transfer operation is complete, e.g., a hub response is received at step 926 comprising an indication that the end firmware transfer command has been successfully executed, the process proceeds to steps 930 (for SPD hub 65) and 938 (for entity 85).

At step 930, SPD hub 65 extracts signature information from the firmware package and decrypts the signature to obtain a firmware data hash of the firmware data package, e.g., using the new public key generated based on the opaque data field.

At step 932, SPD hub 65 computes a firmware (FM) data hash based on the firmware data installed in the future update slot.

At step 934, SPD hub 65 checks the validity of the firmware signature by comparing the obtained firmware data hash to the computed firmware data hash.

If the firmware signature not valid, e.g., there is a mismatch between the obtained firmware data hash and the computed firmware data hash, SPD hub 65 discards the firmware data package, e.g., clears, deletes or overwrites the firmware data in the future update slot, sets the error flag and generates a response message comprising the error flag, e.g., in the format of response message 500 (FIG. 10) at step 936. SPD hub 65 also clears the nonce and the new key pair and exits the firmware management mode. The process then proceeds to the start and entity 85 will need to request that SPD hub 65 enter firmware management mode again in order to make another attempt to update the firmware.

If the firmware signature is valid, e.g., there is a match between the obtained firmware data hash and the computed firmware data hash, SPD hub 65 enables firmware activation and awaits an activate firmware command from memory controller 80 and the process proceeds to step 938 to initiate an activate firmware operation.

At step 938, entity 85 generates a firmware update message, e.g., in the format of request message 400 (FIG. 10), comprising an activate firmware command. Entity 85 provides the firmware update message to memory controller 80 and the firmware update message is provided by memory controller 80 to SPD hub 65. In some embodiments, the firmware update message is signed with the new private key and includes the nonce generated by SPD hub 65 in a similar manner to the firmware update messages described above for step 916 In this manner, memory controller 80 asserts a firmware transfer request including a second signature and a second nonce in a firmware data package as a part of the firmware update package.

In response to receiving the firmware update message comprising the activate firmware command, SPD hub 65 is configured to activate the firmware, e.g., by making the future update slot the active slot and making the active slot the future update slot, clear the nonce, clear the new key pair and exit from the firmware management mode at step 940. SPD hub 65 is also configured to generate a response message, e.g., in the format of response message 500 (FIG. 10), that indicates that the firmware update command was executed and provide the response message to memory controller 80 at step 942. In some embodiments, SPD hub 65 performs validity checks on the firmware update message that are similar to those described above for steps 918 and 934.

At step 944, SPD hub 65 performs a power cycle operation to install the new firmware.

At step 946, once SPD hub 65 has restarted, the new firmware takes effect.

While the above example process is described as having particular steps or steps in a particular order, in other embodiments only some of the steps may be performed or the steps may be performed in any other order.

As described in illustrative embodiments, SPD hub 65 is configured to manage the write protection for individual and groups of blocks and to manage firmware updates on an entity-by-entity basis during normal run time operation through the use of individual certificate chains 326 installed in corresponding slots 324 by each of the entities 85. Additional protection for the request and response messages is provided through the use of secret private keys for each entity 85 in conjunction with unique nonces temporarily generated by SPD hub 65 and provided to memory controller 80 for use in subsequent request messages that are signed by and received from a validated entity 85.

While in illustrative embodiments, SPD hub 65 is described as being utilized in a memory module such as, e.g., a DDR memory module, in other embodiments SPD hub 65 including components and processes described above may be utilized to manage write protection or firmware updates in any other device or system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
    a memory slot comprising a certificate chain corresponding to an entity;
    a plurality of memory blocks comprising a first memory block and a second memory block, wherein the first memory block and the second memory block having have protection enabled; and
    at least one processing device coupled to memory, the at least one processing device being configured to:
        receive a first request message to clear protection for the first memory block from a computing device of the entity, the first request message comprising a first signature generated based at least in part on a private key of the entity;
        receive a second request message to clear the protection for the second memory block from the computing device of the entity, the second request message comprising a second signature generated based at least in part on the private key of the entity;
        determine a public key corresponding to the entity based at least in part on the certificate chain;
        determine that the first signature and the second signature are valid based at least in part on the public key;
        determine that the protection for the first memory block corresponds to the certificate chain;
        determine that the protection for the second memory block does not correspond to the certificate chain;
        clear the protection for the first memory block based at least in part on the determination that the first signature is valid and that the protection for the first memory block corresponds to the certificate chain; and
        return a response message comprising an error based at least in part on a determination that the protection for the second memory block does not correspond to the certificate chain.

2. The apparatus of claim 1, wherein the at least one processing device is further configured to:
    receive the certificate chain from the computing device of the entity; and
    install the certificate chain in the memory slot,
    wherein the protection for the memory block is one of a write protection and a read protection.

3. The apparatus of claim 1, wherein:
    the memory slot comprises a plurality of memory slots;
    the certificate chain comprises a first certificate chain installed in a first memory slot of the plurality of memory slots and the entity comprises a first entity;
    a memory second slot of the plurality of memory slots comprises a second certificate chain corresponding to a second entity; and
    the at least one processing device is further configured to:
        receive a third request message to clear the protection for the second memory block from a computing device of the second entity, the third request message comprising a third signature generated based at least in part on a private key of the second entity;
        determine a second public key corresponding to the second entity based at least in part on the second certificate chain;
        determine that the third signature is valid based at least in part on the second public key;
        determine that the protection for the second memory block corresponds to the second certificate chain; and
        clear the protection for the second memory block based at least in part on a determination that the second signature is valid and that the protection for the second memory block corresponds to the second certificate chain.

4. The apparatus of claim 1, wherein the certificate chain comprises a plurality of certificates including a decrypt certificate, the decrypt certificate storing the public key that corresponds to the private key of the entity.

5. The apparatus of claim 1, wherein:
    the at least one processing device is further configured to:
        receive a third request message to enter a set/clear protection mode from the computing device of the entity, the third request message comprising a third signature generated based at least in part on the private key of the entity;
        determine the public key corresponding to the entity based at least in part on the certificate chain;
        determine that the third signature is valid based at least in part on the public key; and
        return a response message comprising a first nonce to the computing device of the entity based at least in part on the determination that the third signature is valid;
    the first request message comprises a second nonce;
    the at least one processing device is further configured to determine that the second nonce matches the first nonce; and
    the clearing of the protection for the first memory block is based at least in part on the determination that the second nonce matches the first nonce.

6. The apparatus of claim 1, wherein the at least one processing device is further configured to:
    receive a request message to void the certificate chain from a computing device of the entity, the request message comprising a signature generated based at least in part on a private key of the entity;

determine the public key corresponding to the entity based at least in part on the certificate chain;
determine that the signature is valid based at least in part on the public key; and
void the certificate chain based at least in part on the determination that the signature is valid.

7. A method implemented by at least one processing device comprising hardware, the method comprising:
receiving a first request message to clear protection for a first memory block of a plurality of memory blocks of an apparatus from a computing device of an entity, the request message comprising a first signature generated based at least in part on a private key of the entity;
receiving a second request message to clear the protection for a second memory block of the plurality of memory blocks from the computing device of the entity, the second request message comprising a second signature generated based at least in part on the private key of the entity;
determining a public key corresponding to the entity based at least in part on a certificate chain installed in a memory slot of the apparatus, the certificate chain corresponding to the entity;
determining that the first signature and second signature are valid based at least in part on the public key;
determining that the protection for the second memory block does not correspond to the certificate chain;
determining that the protection for the memory block corresponds to the certificate chain;
clearing the protection for the first memory block based at least in part on the determination that the signature is valid and that the protection for the first memory block corresponds to the certificate chain; and
returning a response message comprising an error based at least in part on the determination that the protection for the second memory block does not correspond to the certificate chain.

8. The method of claim 7, wherein method further comprises:
receiving the certificate chain from the computing device of the entity; and
installing the certificate chain in the memory slot,
wherein the protection for the memory block is one of a write protection and a read protection.

9. The method of claim 7, wherein:
the memory slot comprises a plurality of memory slots;
the certificate chain comprises a first certificate chain installed in a first memory slot of the plurality of memory slots and the entity comprises a first entity;
a memory second slot of the plurality of memory slots comprises a second certificate chain corresponding to a second entity;
the method further comprises:
receiving a third request message to clear the protection for the second memory block from a computing device of the second entity, the third request message comprising a third signature generated based at least in part on a private key of the second entity;
determining a second public key corresponding to the second entity based at least in part on the second certificate chain;
determining that the third signature is valid based at least in part on the second public key;
determining that the protection for the second memory block corresponds to the second certificate chain; and
clearing the protection for the second memory block based at least in part on the determination that the second signature is valid and that the protection for the second memory block corresponds to the second certificate chain.

10. The method of claim 7, wherein the certificate chain comprises a plurality of certificates including a decrypt certificate, the decrypt certificate storing the public key that corresponds to the private key of the entity.

11. The method of claim 7, wherein:
the method further comprises:
receiving a third request message to enter a set/clear protection mode from the computing device of the entity, the third request message comprising a third signature generated based at least in part on the private key of the entity;
determining the public key corresponding to the entity based at least in part on the certificate chain;
determining that the second third signature is valid based at least in part on the public key; and
returning a response message comprising a first nonce to the computing device of the entity based at least in part on the determination that the third signature is valid;
the first request message comprises a second nonce;
the method further comprises determining that the second nonce matches the first nonce; and
the clearing of the protection for the first memory block is based at least in part on the determination that the second nonce matches the first nonce.

12. The method of claim 7, wherein the method further comprises:
receiving a request message to void the certificate chain from a computing device of the entity, the request message comprising a signature generated based at least in part on a private key of the entity;
determining the public key corresponding to the entity based at least in part on the certificate chain;
determining that the signature is valid based at least in part on the public key; and
voiding the certificate chain based at least in part on the determination that the signature is valid.

* * * * *